United States Patent
Kita et al.

(10) Patent No.: US 7,131,266 B2
(45) Date of Patent: Nov. 7, 2006

(54) SECONDARY AIR SUPPLY CONTROL APPARATUS FOR INTERNAL COMBUSTION ENGINE

(75) Inventors: Masayuki Kita, Kariya (JP); Toru Noma, Kariya (JP); Kenichi Fujiki, Toyoake (JP); Tomoyuki Takagawa, Kariya (JP)

(73) Assignee: Denso Corporation, Kariya (JP)

( * ) Notice: Subject to any disclaimer, the term of this patent is extended or adjusted under 35 U.S.C. 154(b) by 93 days.

(21) Appl. No.: 10/791,852

(22) Filed: Mar. 4, 2004

(65) Prior Publication Data

US 2004/0172934 A1    Sep. 9, 2004

(30) Foreign Application Priority Data

| Mar. 4, 2003 | (JP) | ............................. 2003-057562 |
| Mar. 4, 2003 | (JP) | ............................. 2003-057563 |
| Mar. 7, 2003 | (JP) | ............................. 2003-061205 |
| Mar. 27, 2003 | (JP) | ............................. 2003-088843 |

(51) Int. Cl.
    *F01N 3/00*    (2006.01)
(52) U.S. Cl. .............................. 60/289; 60/285; 60/287
(58) Field of Classification Search ................. 60/285, 60/289, 287
    See application file for complete search history.

(56) References Cited

U.S. PATENT DOCUMENTS

| 5,247,910 | A | * | 9/1993 | Abe ............................ 123/688 |
| 5,285,639 | A | * | 2/1994 | Araki et al. ................... 60/274 |
| 5,315,823 | A | | 5/1994 | Nishikawa et al. |
| 5,357,749 | A | * | 10/1994 | Ohsuga et al. ................. 60/274 |
| 5,388,402 | A | * | 2/1995 | Aoki et al. .................... 60/276 |
| 5,448,887 | A | * | 9/1995 | Takeshima .................... 60/278 |
| 5,493,857 | A | * | 2/1996 | Komatsuda et al. .......... 60/284 |
| 5,537,321 | A | | 7/1996 | Yoshizaki et al. |
| 5,675,968 | A | * | 10/1997 | Katashiba et al. ............ 60/276 |
| 5,822,976 | A | * | 10/1998 | Cockerill ...................... 60/274 |
| 5,887,421 | A | * | 3/1999 | Mitsutani ...................... 60/274 |
| 6,155,043 | A | * | 12/2000 | Zhang et al. .................. 60/284 |
| 2004/0060282 | A1 | * | 4/2004 | Hirooka ........................ 60/278 |

FOREIGN PATENT DOCUMENTS

JP     2001-263050     9/2001

* cited by examiner

*Primary Examiner*—Thomas Denion
*Assistant Examiner*—Loren Edwards
(74) *Attorney, Agent, or Firm*—Nixon & Vanderhye, P.C.

(57) ABSTRACT

When a specified air-fuel ratio F/B control condition is established during supply of a secondary air provided, an air-fuel ratio F/B control is executed, and at this time, an initial value of a target air-fuel ratio is set to a before-catalyst air-fuel ratio detected by an A/F (air-fuel ratio) sensor. The target air-fuel ratio subsequent to this is gradually changed from the initial value to a specified air-fuel ratio. By this, the initial value of the target air-fuel ratio can be suitably set at a start time of execution of the air-fuel ratio F/B control during the supply of the secondary air. The target air-fuel ratio subsequent to this is gradually changed to a stoichiometric air-fuel ratio, so that a change in engine rotation speed is suppressed and the drivability can be improved.

13 Claims, 13 Drawing Sheets

SECONDARY AIR SUPPLY CONTROL APPARATUS FOR INTERNAL COMBUSTION ENGINE

CROSS-REFERENCE TO RELATED APPLICATION

This application claims priority to JP Application No. 2003-57562, filed 04 Mar. 2003, JP Application No. 2003-57563 filed 04 Mar. 2003, JP Application No. 2003-61205 filed 07 Mar. 2003 and JP Application No. 2003-88843 filed 27 Mar. 2003. The entire contents of this application are incorporated herein by reference.

FIELD OF THE INVENTION

The present invention relates to a secondary air supply control apparatus for an internal combustion engine for supplying secondary air to a catalyst in an exhaust passage of the internal combustion engine to activate the catalyst.

Description of the Related Art

BACKGROUND OF THE INVENTION

Conventionally, as related art documents relating to a secondary air supply control apparatus of an internal combustion engine, JP-A-5-171973 is known. This document discloses a technique to warm up a catalyst early without using a high capacity air pump.

In the above related art, an air-fuel ratio supplied to the internal combustion engine is set to a rich side and secondary air is supplied, so that the catalyst can be early warmed up and activated. Conventionally, an air-fuel ratio feedback control during supply of secondary air has not been generally carried out since it is difficult. Thus, there has been a disadvantage that when the air-fuel ratio is disturbed by some disturbance factor during the supply of the secondary air, the engine rotation speed is much changed and the drivability becomes worse.

In order to cope with this, it is effective to execute the air-fuel ratio feedback control during the supply of the secondary air, however, when setting of a target air-fuel ratio at the time of start of the execution is not suitable, the air-fuel ratio supplied to the internal combustion engine is suddenly changed by this target air-fuel ratio, and a change occurs in the engine rotation speed, and as a result, there is fear that there occurs such a disadvantage that the drivability becomes worse.

Besides, according to JP-A-6-212959, after an upstream side catalyst is activated among plural catalysts, and when secondary air is being supplied to an exhaust system, heat energy, together with exhaust discharged to the exhaust system from the internal combustion engine, to be conveyed to the plural catalysts is increased, and since the heat energy, together with the exhaust, to be conveyed to the respective catalysts is not increased before the activation of the upstream side catalyst, degradation of emission is suppressed by that, and warm-up of the catalyst can be quickly performed.

Besides, according to JP-A-2001-263050, since exhaust gas from an internal combustion engine is heated up to the temperature at which it can burn in an exhaust passage at an upstream side of a catalyst, afterburning occurs, and the catalyst can be warmed up early by its burning heat, and unburned HC (hydrocarbon) exhausted from the internal combustion engine is burned by the afterburning.

SUMMARY OF THE INVENTION

The present invention has been made to solve such disadvantages and has an object to provide a secondary air supply control apparatus of an internal combustion engine which executes an air-fuel ratio feedback control during supply of secondary air, and suitably sets a target air-fuel ratio at the start time of execution of the air-fuel ratio feedback control, so that a change in engine rotation speed is suppressed and drivability can be improved.

According to a secondary air supply control apparatus of an internal combustion engine of the invention, when a specified air-fuel ratio feedback control condition is established during supply of secondary air supplied by a secondary air supply mechanism into an exhaust passage at an upstream side of a catalyst, an air-fuel ratio feedback control is executed by an air-fuel ratio feedback control unit to cause an air-fuel ratio detected by an air-fuel ratio detection unit to become coincident with a target air-fuel ratio. As stated above, the air-fuel ratio feedback control is executed during the supply of the secondary air, so that a disturbance in the air-fuel ratio due to an external factor is suppressed during the supply of the secondary air, a change in the engine rotation speed during the supply of the secondary air is suppressed, an d the drivability is improved.

Besides, in the air-fuel ratio feedback control unit of the secondary air supply control apparatus of the internal combustion engine, an initial value of the target air-fuel ratio at a start time of execution of the air-fuel ratio feedback control is set to an air-fuel ratio detected by the air-fuel ratio detection unit at this time, and the subsequent target air-fuel ratio is gradually changed from this initial value to a specified air-fuel ratio. As stated above, since the initial value of the target air-fuel ratio is set to the air-fuel ratio detected by the air-fuel ratio detection unit at this time, the change in the engine rotation speed at the start time of the execution of the air-fuel ratio feedback control is suppressed, and since the target air-fuel ratio is gradually changed from this initial value to the specified air-fuel ratio, also after the execution start of the air-fuel ratio feedback control, the change in the engine rotation speed is excellently suppressed until the target air-fuel ratio becomes the specified air-fuel ratio, and the drivability is improved.

Besides, in the air-fuel ratio feedback control unit of the secondary air supply control apparatus of the internal combustion engine of the invention, an initial value of the target air-fuel ratio at a start time of execution of the air-fuel ratio feedback control is set to a minimum air-fuel ratio detected by the air-fuel ratio detection unit in a specified period from a supply start of the secondary air, and the subsequent target air-fuel ratio is gradually changed from this initial value to a specified air-fuel ratio. As stated above, since the initial value of the target air-fuel ratio is set to the minimum air-fuel ratio detected by the air-fuel ratio detection unit in the specified period from the supply start of the secondary air, the change in the engine rotation speed at the start time of the execution of the air-fuel ratio feedback control is suppressed, and since the target air-fuel ratio is gradually changed from this initial value to the specified air-fuel ratio, also after the execution start of the air-fuel ratio feedback control, the change in the engine rotation speed is excellently suppressed until the target air-fuel ratio becomes the specified air-fuel ratio, and the drivability is improved.

DETAILED DESCRIPTION OF EMBODIMENTS

Hereinafter, embodiments of the present invention will be described with reference to the drawings.

Figure 1:
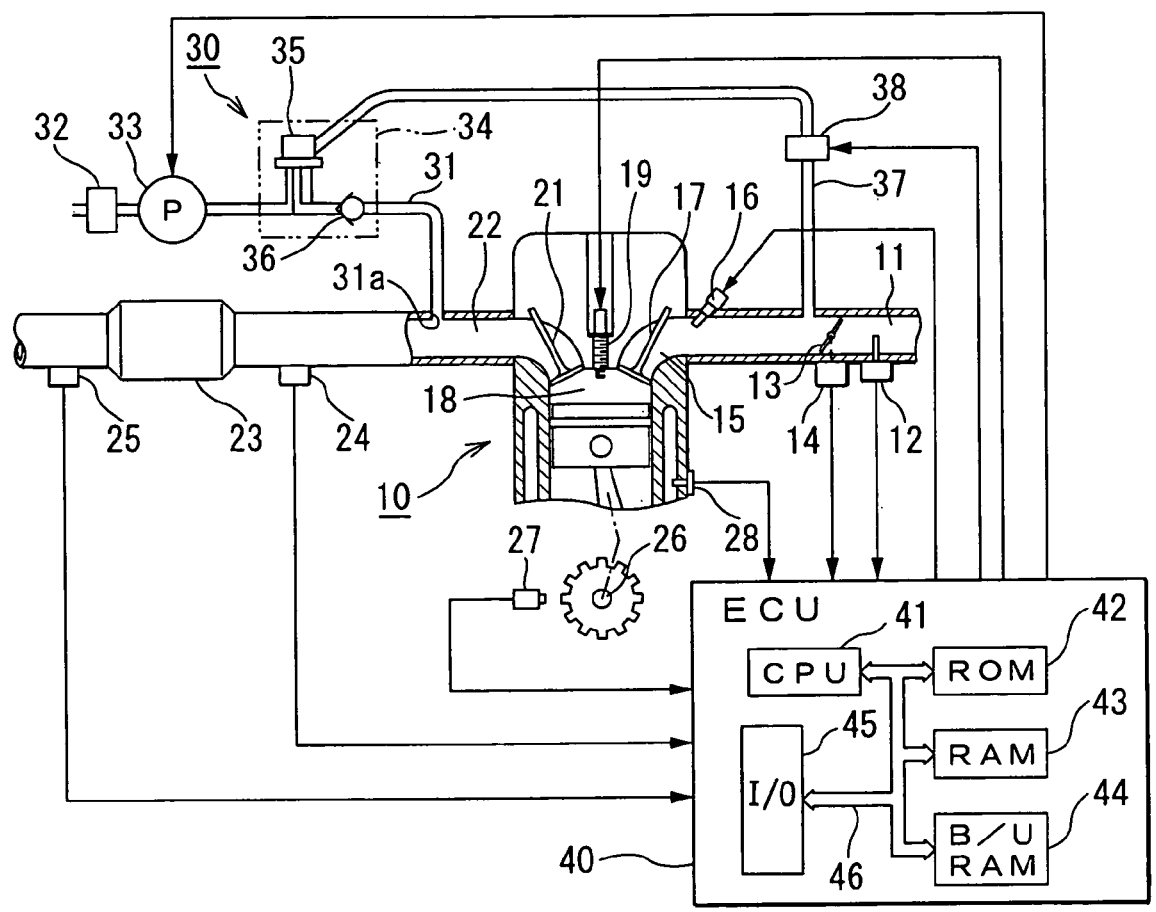
FIG. 1 is a schematic structural view showing an internal combustion engine to which a secondary air supply control apparatus according to an embodiment of the invention is applied and its peripheral equipment.

FIG. 1 is a schematic structural view showing an internal combustion engine to which a secondary air supply control apparatus of an internal combustion engine according to a first embodiment of the invention is applied and its peripheral equipment.

In FIG. 1, reference numeral 10 denotes an internal combustion engine, and an air flow meter 12 for detecting the amount of intake air supplied through a not-shown air cleaner is disposed at the upstream side of an intake passage 11 of the internal combustion engine 10. A throttle valve 13 for adjusting the intake air amount to the internal combustion engine 10 is disposed at the downstream side of the air-flow meter 12. The throttle valve 13 is provided with a throttle opening sensor 14 for detecting the degree of opening thereof. An injector (fuel injection valve) 16 for injecting and supplying fuel is disposed in the intake passage 11 and in the vicinity of an intake port 15 of each cylinder of the internal combustion engine 10.

Then, an air-fuel mixture of the intake air adjusted by the throttle valve 13 and the fuel injected and supplied by the injector 16 is introduced into a combustion chamber 18 of the internal combustion engine 10 by opening an intake valve 17. Besides, an ignition plug 19 is disposed for each cylinder at a cylinder head side of the internal combustion engine 10. The air-fuel mixture in the combustion chamber 18 is ignited by spark discharge of the ignition plug 19. The air-fuel mixture is burned in the combustion chamber 18, and then, an exhaust valve 21 is opened so that the mixture is exhausted as an exhaust gas from the combustion chamber 18 to an exhaust passage 22.

A well-known three-way catalyst 23 is disposed in the exhaust passage 22, an A/F (air-fuel ratio) sensor 24 for outputting a linear signal in accordance with the air-fuel ratio of the exhaust gas is disposed at the upstream side thereof. An output voltage of the oxygen sensor 25 is inverted according to whether the air-fuel ratio of the exhaust gas is rich or lean with respect to a stoichiometric air-fuel ratio. An oxygen sensor 25 is disposed at the downstream side thereof. Besides, a crank shaft 26 of the internal combustion engine 10 is provided with a crank angle sensor 27 for detecting a crank angle [° CA (Crank Angle)] as its rotation angle. The engine rotation speed of the internal combustion engine 10 is calculated on the basis of the crank angle which is detected by the crank angle sensor 27 and by which the crank shaft 26 rotates in a specified time. Further, a water temperature sensor 28 for detecting a cooling water temperature is disposed in the internal combustion engine 10.

Next, a structure of a secondary air supply mechanism 30 for supplying outer air into the exhaust passage 22 will be described. A secondary air supply passage 31 for supply of secondary air is connected to the exhaust passage 22 at the upstream side of the A/F sensor 24. An air filter 32 is disposed at the atmospheric side of the secondary air supply passage 31, and an air pump 33 for pressure sending the secondary air is disposed at the downstream side of the air filter 32.

A combination valve 34 is disposed at the exhaust passage 22 side of the air pump 33. The combination valve 34 is constructed such that a pressure driving type open/close valve 35 for opening/closing the secondary air supply passage 31 and a check valve 36 at the downstream side thereof are unified. In the open/close valve 35 of the combination valve 34, opening/closing is switched by back pressure introduced through an intake pressure introduction passage 37. The intake pressure introduction passage 37 is connected to the intake passage 11, and the back pressure of the open/close valve 35 is switched between the atmospheric pressure and the intake pressure by an electromagnetic driving type switching valve 38 disposed midway in the intake pressure introduction passage 37.

That is, in the case where the secondary air is supplied, the switching valve 38 is opened to introduce the intake pressure of the intake passage 11. Then, the open/close valve 35 is opened by introducing the intake pressure to the open/close valve 35. By this, the secondary air discharged from the air pump 33 passes through the open/close valve 35 and flows to the check valve 36 side. The check valve 36 is for regulating the inflow of the exhaust gas from the exhaust passage 22, and when the secondary air pressure of the air pump 33 becomes higher than the exhaust gas pressure, the check valve 36 is opened by the pressure, and the secondary air is supplied into the exhaust passage 22.

On the other hand, in the case where the secondary air is stopped, the air pump 33 is stopped, and the switching valve 38 is switched to a position where the atmospheric pressure is introduced, so that the atmospheric pressure is introduced to the open/close valve 35. By this, the open/close valve 35 is closed. Then, the secondary air to the exhaust passage 22 is stopped, the pressure of the secondary air does not act on the check valve 36, and the pressure at the exhaust passage 22 side becomes high. Thus, the check valve 36 is automatically closed, and it is possible to prevent the exhaust gas in the exhaust passage 22 from flowing backward to the air pump 33 side.

Reference numeral 40 denotes an ECU (Electronic Control Unit), and the ECU 40 is constructed as a logical operation circuit including a CPU 41 as a central processing unit for executing various well-known operation processings, a ROM 42 for storing a control program, a control map and the like, a RAM 43 for storing various data, a B/U (backup) RAM 44, an input/output circuit 45, a bus line 46 for connecting them, and the like. The foregoing various sensor signals are inputted to the ECU 40, and on the basis of the inputted signals, control signals are outputted from the ECU 40 to the injector 16, the ignition plug 19, the air pump 33 of the secondary air supply mechanism 30, the switching valve 38 and the like.

Figure 8A:
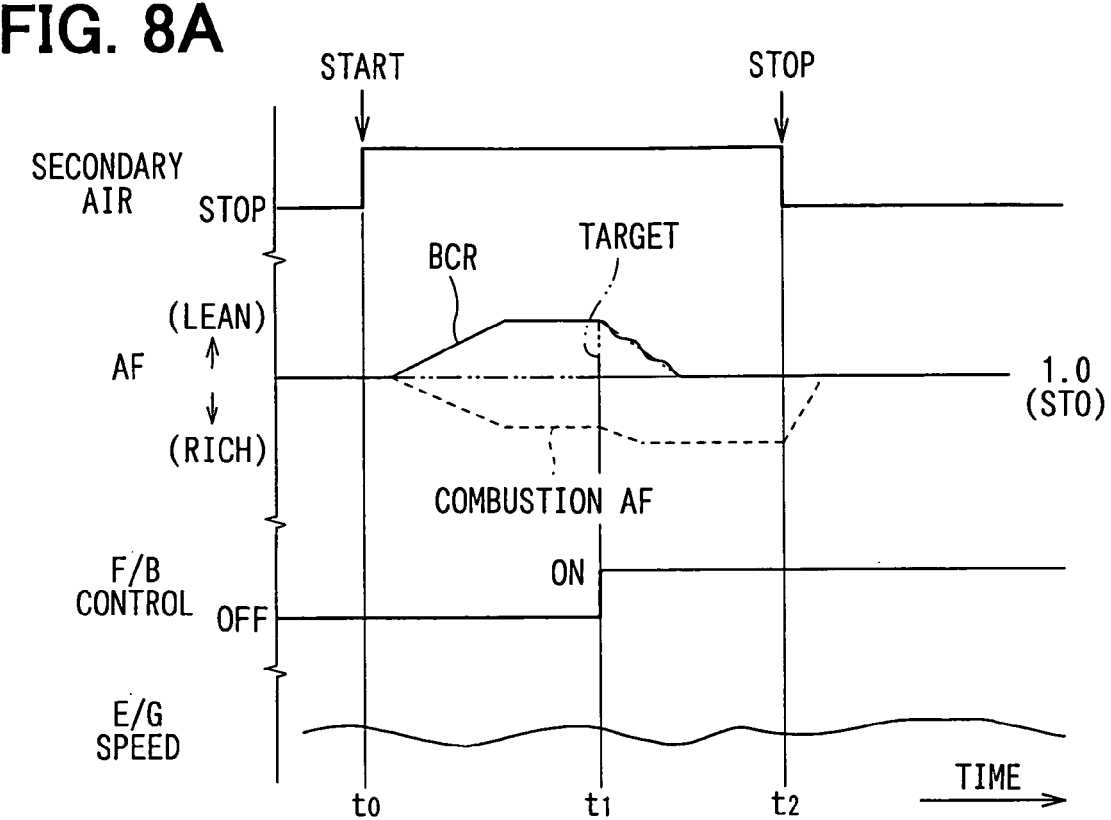
FIGS. 8A and 8B are time charts showing transition states of various sensor signals and various control amounts corresponding to the secondary air supply control of FIGS. 2 to 7, and corresponding to a secondary air supply control for comparison in which a target air-fuel ratio is set to a stoichiometric air-fuel ratio at a start time of execution of an air-fuel ratio F/B control during supply of secondary air.
Figure 8B:
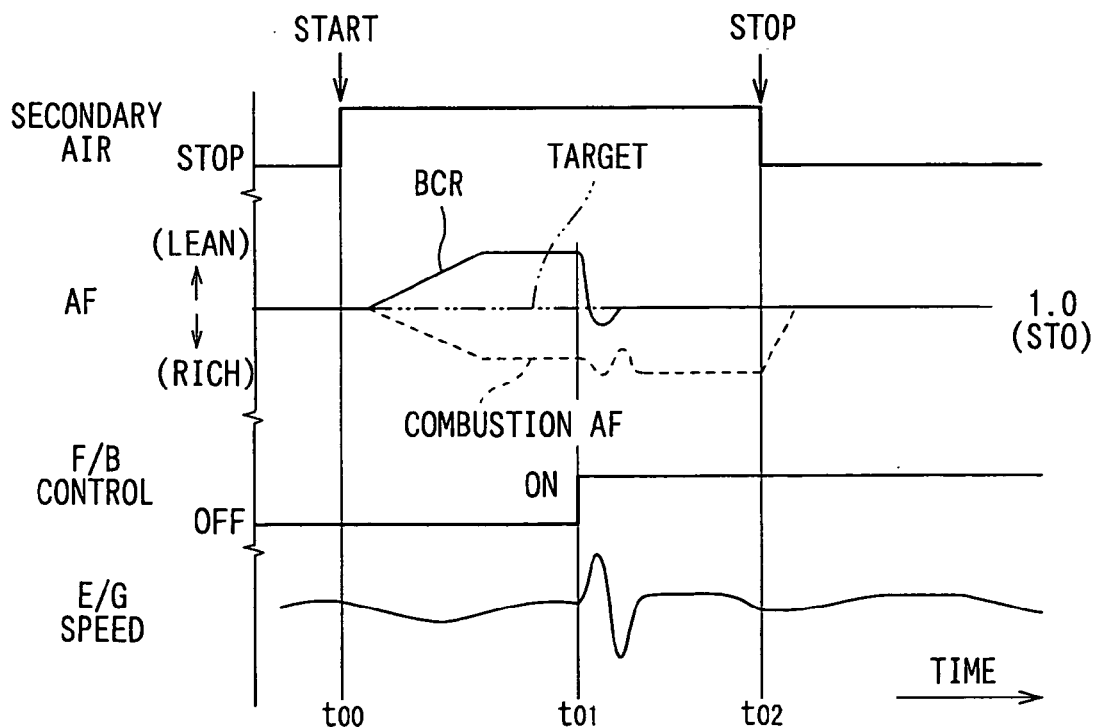

Next, a processing procedure of a secondary air supply control by the CPU 41 of the ECU 40 used in the secondary air supply control apparatus of the internal combustion engine according to the embodiment of the invention will be described based on a flowchart of FIG. 2 and with reference to FIGS. 8A and 8B. Here, FIG. 8A is a time chart showing transition states of various sensor signals and various control amounts corresponding to the secondary air supply control of the embodiment, and FIG. 8B is a time chart showing transition states of various sensor signals and various control amounts corresponding to a secondary air supply control for comparison in which a target air-fuel ratio is set to a stoichiometric air-fuel ratio at the start time of execution of an air-fuel ratio feedback control during supply of secondary air. Incidentally, this secondary air supply control routine is repeatedly executed by the CPU 41 at specified time intervals.

Figure 2:
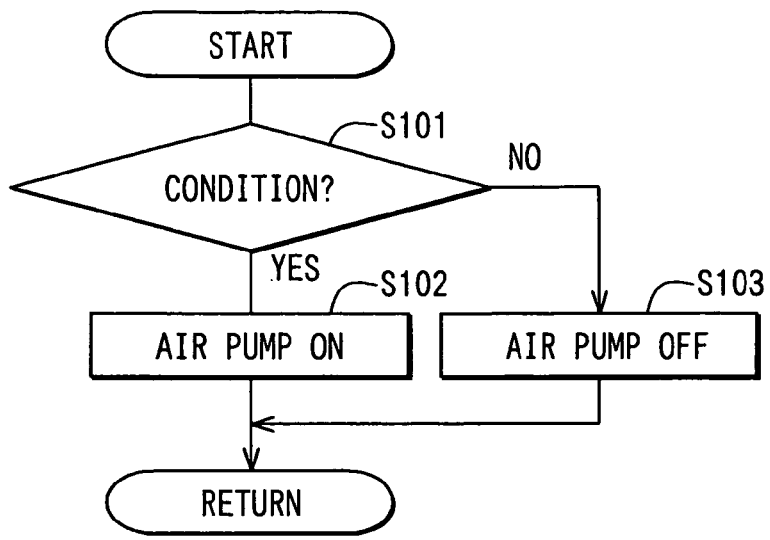
FIG. 2 is a flowchart showing a processing procedure of a secondary air supply control by a CPU of an ECU used in the secondary air supply control apparatus of the internal combustion engine according to the embodiment of the invention.

In FIG. 2, at step S101, it is judged whether a secondary air supply condition for early warm-up and activation of the three-way catalyst 23 is established. This secondary air supply control condition is established when a cooling water temperature detected by the water sensor 28 is a specified temperature or higher, a stop period of the internal combustion engine 10 from warm-up is short, or an intake air amount is relatively small. When the judgment condition of the step S101 is established, that is, when the secondary air supply control condition is established, the procedure proceeds to step S102, the air pump 33 is turned ON (see a period from time t0 to time t2 shown in FIG. 8A in which the secondary air is being supplied), and this routine is ended.

At the time when this air pump 33 is ON, as described above, the switching valve 38 constituting the secondary air supply mechanism 30 is opened, and the intake pressure is introduced to the open/close valve 35 of the combination valve 34 through the intake pressure introduction passage 37 so that the open/close valve 35 is opened. By this, the secondary air discharged from the air pump 33 passes through the open/close valve 35, and when the secondary air pressure of the air pump 33 becomes higher than the exhaust gas pressure, the check valve 36 of the combination valve 34 is opened, and the secondary air passes through the secondary air supply passage 31 and is supplied from a secondary air supply hole 31a into the exhaust passage 22.

On the other hand, when the judgment condition of the step S101 is not established, that is, when the secondary air supply control condition is not established, the procedure proceeds to step S103, the air pump 33 is turned OFF (see a period before time t0 and after t2 shown in FIG. 8A in which the secondary air supply is stopped), and this routine is ended. At the time when the air pump 33 is OFF, as described above, the switching valve 38 constituting the secondary air supply mechanism 30 is closed, and the atmospheric pressure is introduced to the open/close valve 35 of the combination valve 34 through the intake pressure introduction passage 37 so that the open/close valve 35 is closed. By this, the pressure at the exhaust passage 22 side becomes high, and the check valve 36 of the combination valve 34 is automatically closed.

Next, a processing procedure of a fuel injection control by the CPU 41 of the ECU 40 used in the secondary air supply control apparatus of the internal combustion engine according to the first embodiment of the invention will be described based on a flowchart of FIG. 3 and with reference to FIGS. 8A and 8B. Incidentally, this fuel injection control routine is repeatedly executed by the CPU 41 at specified time intervals.

Figure 3:
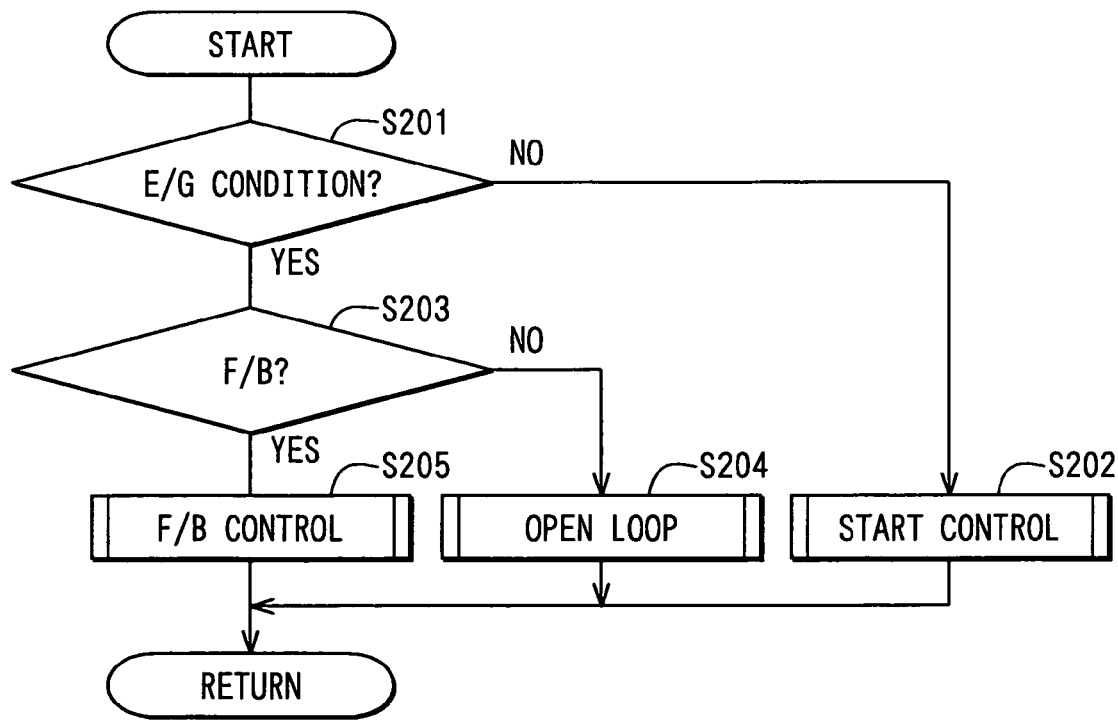
FIG. 3 is a flowchart showing a processing procedure of a fuel injection control by the CPU of the ECU used in the secondary air supply control apparatus of the internal combustion engine according to the embodiment of the invention.

In FIG. 3, at step 201, it is judged whether starting of the internal combustion engine 10 is completed. Here, it is judged whether the engine rotation speed becomes, for example 500 [rpm] or higher by cranking, and the internal combustion engine 10 is in the starting completion state. When the judgment condition of the step S201 is not established, that is, when the internal combustion engine 10 has not yet been in the starting completion state, the procedure proceeds to step S202, a well-known starting time increase in fuel injection amount is executed as a starting time control processing on the basis of the cooling water temperature detected by the temperature sensor 28, and this routine is ended.

On the other hand, when the judgment condition of the step S201 is established, that is, when the internal combustion engine 10 is in the starting completion state, the procedure proceeds to step S203, and it is judged whether an air-fuel ratio F/B (feedback) control condition is established. The air-fuel ratio F/B control condition is established when the A/F sensor 24 is activated and the operation state of the internal combustion engine 10 is in a steady state, not a transition state. When the judgment condition of the step 203 is not established, that is, when the A/F sensor 24 is inactive or the operation state of the internal combustion engine 10 is in the transition state and the air-fuel ratio F/B control condition is not established, the procedure proceeds to step S204, an after-mentioned open loop control processing is executed, and this routine is ended.

On the other hand, when the judgment condition of the step S203 is established, that is, when the A/F sensor 24 is activated and the operation state of the internal combustion engine 10 is in the steady state and the air-fuel ratio F/B control condition is established (time t1 shown in FIG. 8A), the procedure proceeds to step S205, an after-mentioned air-fuel ratio F/B control processing is executed, and this routine is ended.

Next, a processing procedure of the open loop control at the step S204 of the fuel injection control routine of FIG. 3 will be described based on a flowchart of FIG. 4 and with reference to FIGS. 8A and 8B.

Figure 4:
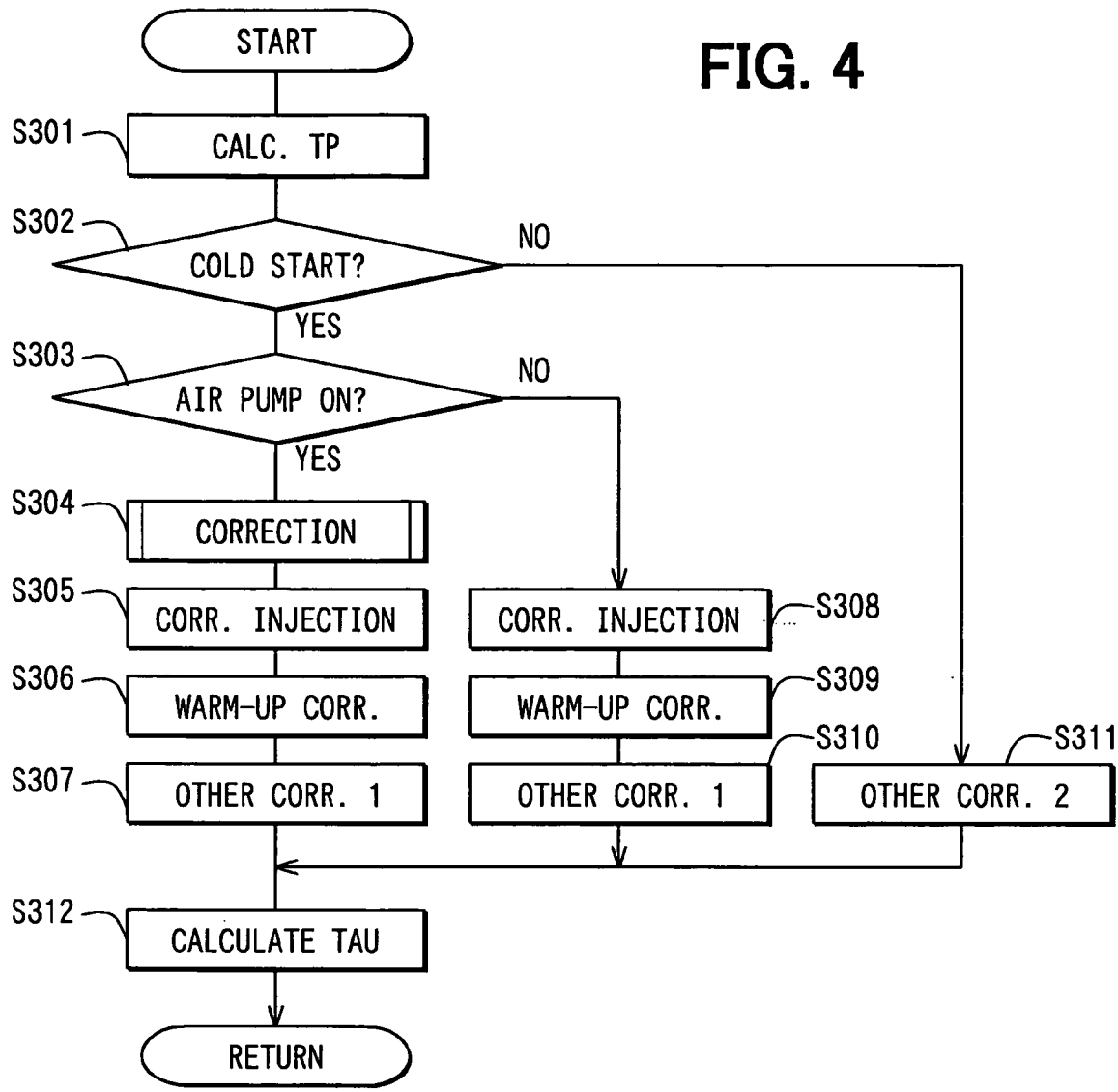
FIG. 4 is a flowchart showing a processing procedure of an open loop control in FIG. 3.

In FIG. 4, at step S301, a basic fuel injection amount TP is calculated based on the engine rotation speed and the intake air amount. Next, the procedure proceeds to step S302, and it is judged whether cold starting is performed. When the judgment condition of the step S302 is established, that is, when the cooling water temperature is low to be is a specified temperature or lower, and the cold starting is performed, the procedure proceeds to step S303, and it is judged whether the air pump 33 is ON. When the judgment condition of the step S303 is established, that is, when the air pump 33 is ON and the secondary air passes through the secondary air supply passage 31 and is supplied from the secondary air supply hole 31a into the exhaust passage 22 (time t0 to time t2 shown in FIG. 8A), the procedure proceeds to step S304.

At the step S304, an air pump correction amount of the fuel injection amount on the basis of the secondary air supply from the air pump 33 is calculated. Next, the procedure proceeds to step S305, and an after-starting correction amount of the fuel injection amount is calculated on the basis of the engine rotation speed and the load. Next, the procedure proceeds to step S306, and a warm-up correction amount of the fuel injection amount is calculated on the basis of the cooling water temperature. Next, the procedure proceeds to step S307, and other correction amount 1 is calculated.

On the other hand, when the judgment condition of the step S303 is not established, that is, when the air pump 33 is OFF and the secondary air is not supplied (before time t0 and after time t2 shown in FIG. 8A), the procedure proceeds to step S308, and the after-starting correction amount of the fuel injection amount is calculated on the basis of the engine rotation speed and the load. Next, the procedure proceeds to step S309, and the warm-up correction amount of the fuel injection amount is calculated on the basis of the cooling water temperature. Next, the procedure proceeds to step S310, and the other correction amount 1 is calculated on the basis of other operation parameters of the internal combustion engine 10.

On the other hand, when the judgment condition of the step S302 is not established, that is, when the cooling water temperature is high to be a specified temperature or higher and the cold starting is not performed, the procedure proceeds to step S311, and other correction amount 2 is calculated on the basis of other operation parameters of the internal combustion engine 10. After the processing of the step S307, the step S310 or the step S311, the procedure proceeds to step S312, the final fuel injection amount TAU is calculated based on a following math expression (1), and this routine is ended.

$$TAU=TP+(\text{air pump correction amount})+(\text{after-starting correction amount})+(\text{warm-up correction amount})+(\text{other correction amount 1})+(\text{other correction amount 2}) \qquad (1)$$

Next, a processing procedure of the air-fuel ratio F/B control at the step S205 of the fuel injection control routine of FIG. 3 will be described based on a flowchart of FIG. 5 and with reference to FIGS. 8A and 8B.

Figure 5:
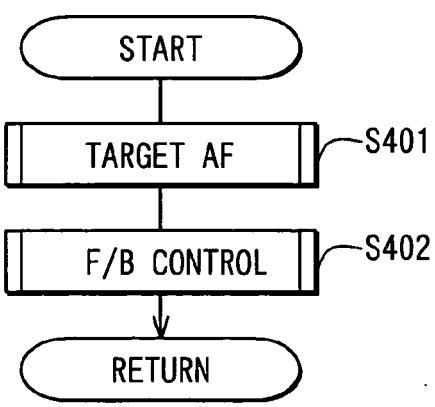
FIG. 5 is a flowchart showing a processing procedure of an air-fuel ratio F/B control in FIG. 3.

In FIG. 5, at step S401, an after-mentioned target air-fuel ratio setting processing is executed. Next, the procedure proceeds to step S402, the air-fuel ratio F/B control processing is executed with respect to the target air-fuel ratio set at the step S401, and this routine is ended. In this air-fuel ratio F/B control processing, the fuel injection amount is adjusted so that an after-mention combustion air-fuel ratio as an air-fuel ratio which is estimated and calculated on the basis of at least one of an engine rotation speed of the internal combustion engine 10, a load, an intake air amount, a cooling water temperature and an after-starting elapsed time, is supplied to the internal combustion engine 10 and contributes to combustion is directed to the rich side and the lean side with respect to the target air-fuel ratio according to the rich dither coefficient and the lean dither coefficient set on the basis of a before-catalyst air-fuel ratio BCR (see FIG. 8A) detected by the A/F sensor 24 and introduced to the three-way catalyst 23 as is commonly known.

Next, a processing procedure of the target air-fuel ratio setting at the step S401 of the air-fuel ratio F/B control routine of FIG. 5 will be described based on a flowchart of FIG. 6 and with reference to FIGS. 8A and 8B.

Figure 6:
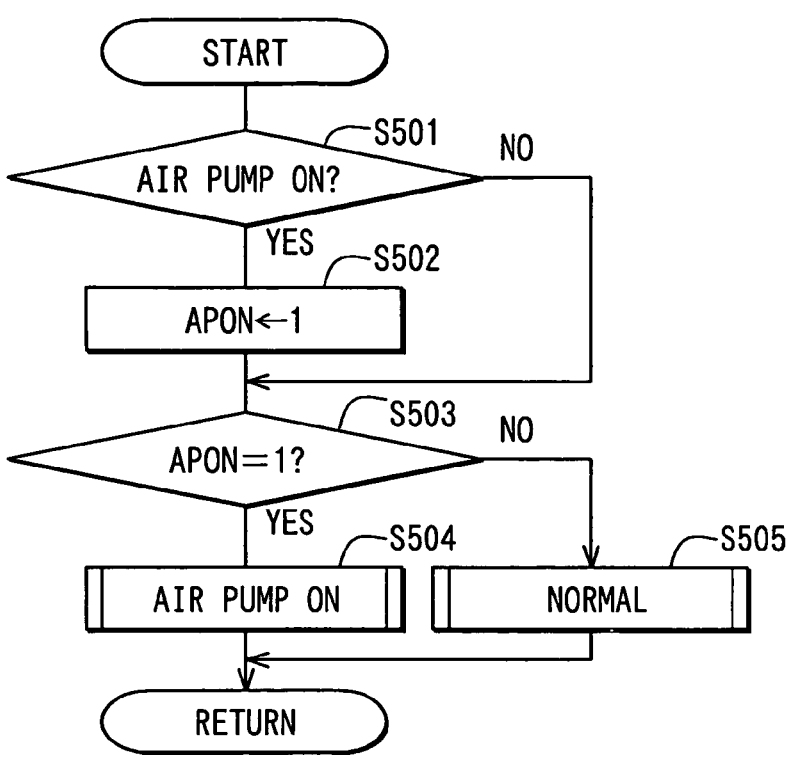
FIG. 6 is a flowchart showing a processing procedure of target air-fuel ratio setting in FIG. 5.

In FIG. 6, at step S501, it is judged whether the air pump 33 is ON. When the judgment condition of the step S501 is established, that is, when the secondary air is being supplied from the air pump 33, the procedure proceeds to step S502, and an APON flag indicating that the secondary air is being supplied from the air pump 33 is set to "1". On the other hand, when the judgment condition of the step S501 is not established, that is, when the secondary air is not being supplied from the air pump 33, the step S502 is skipped.

Next, the procedure proceeds to step S503, and it is judged whether the APON flag is "1". When the judgment condition of the step S503 is established, that is, when the APON flag is "1" and the secondary air is being supplied from the air pump 33 (time t0 to time t2 shown in FIG. 8A), the procedure proceeds to step S504, an after-mentioned target air-fuel ratio setting processing at the air pump ON time is executed, and this routine is ended. On the other hand, when the judgment condition of the step S503 is not established, that is, when the APON flag is "0" and the secondary air is not being supplied from the air pump 33 (before time t0 and after time t2 shown in FIG. 8A), the procedure proceeds to step S505, a well-known normal target air-fuel ratio setting processing is executed, and this routine is ended.

Next, a processing procedure of target air-fuel ratio setting at the air pump ON time and during the supply of the secondary air at the step S504 of the target air-fuel ratio setting routine of FIG. 6 will be described based on a flowchart of FIG. 7 and with reference to FIGS. 8A and 8B.

Figure 7:
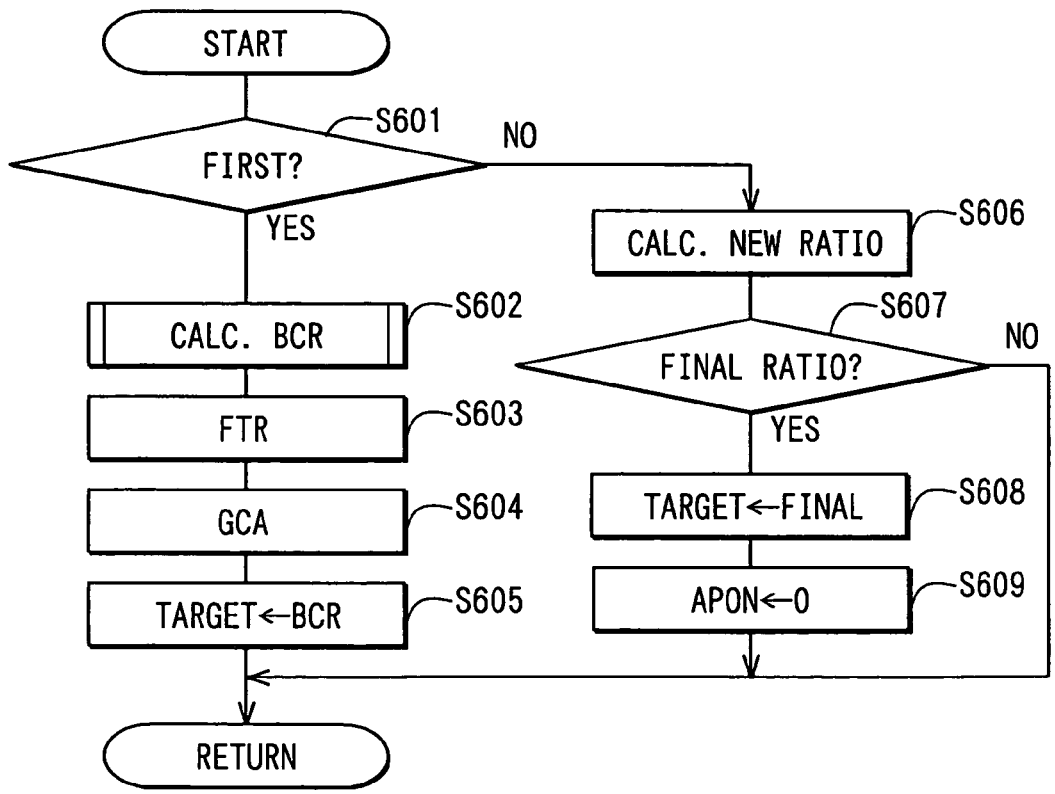
FIG. 7 is a flowchart showing a processing procedure of target air-fuel ratio setting at the ON time of an air pump in FIG. 6.

In FIG. 7, at step S601, it is judged whether the air pump is ON, the secondary air is being supplied, and first target air-fuel ratio setting is performed. When the judgment condition of the step S601 is established, that is, when the first target air-fuel ratio setting is performed (time t1 shown in FIG. 8A), the procedure proceeds to step S602, and a before-catalyst air-fuel ratio BCR calculation processing for calculating the before-catalyst air-fuel ratio (see FIG. 8A) detected by the A/F sensor 24 and introduced to the three-way catalyst 23 is executed. Next, the procedure proceeds to step S603, and a final target air-fuel ratio FTR is set to a stoichiometric air-fuel ratio.

Next, the procedure proceeds to step S604, a target air-fuel ratio gradual change amount GCA is calculated on the basis of a difference between the before-catalyst air-fuel ratio as the initial value of the target air-fuel ratio calculated at the step S602 and the stoichiometric air-fuel ratio set at the step S603. Next, the procedure proceeds to step S605, the before-catalyst air-fuel ratio calculated at the step S602 is made the first target air-fuel ratio at the air pump ON time, and this routine is ended.

On the other hand, when the judgment condition of the step S601 is not established, that is, when the first target air-fuel ratio setting is not performed (period from time t1 shown in FIG. 8A to a time when the before-catalyst air-fuel ratio becomes 1.0 (stoichiometric air-fuel ratio)), the procedure proceeds to step S606, and a new target air-fuel ratio is calculated by adding the target air-fuel ratio gradual change amount calculated at the step S604 to the last target air-fuel ratio. Next, the procedure proceeds to step S607, and it is judged whether the target air-fuel ratio reaches the stoichiometric air-fuel ratio as the final target air-fuel ratio. When the judgment condition of the step S607 is not established, that is, when the target air-fuel ratio has not yet reached the stoichiometric air-fuel ratio, this routine is ended.

On the other hand, when the judgment condition of the step S607 is established, that is, when the target air-fuel ratio reaches the stoichiometric air-fuel ratio as the final target air-fuel ratio, the procedure proceeds to step S608, and the final target air-fuel ratio is made the target air-fuel ratio. Next, the procedure proceeds to step S609, the APON flag is set to "0", that is, it is indicated that the air-fuel ratio control during the supply of the secondary air is ended, and this routine is ended.

In the secondary air supply control shown in FIG. 8B, similarly to the foregoing embodiment, the secondary air is supplied in a period of from time t00 to time t02. However, at time t01, that is, at the start time of execution of the air-fuel ratio F/B control during the supply of the secondary air, the target air-fuel ratio is set to 1.0 (stoichiometric air-fuel ratio). Thus, the before-catalyst air-fuel ratio BCR is suddenly changed to the stoichiometric air-fuel ratio from time t01. It is understood that due to the sudden change of the before-catalyst air-fuel ratio BCR, a large change occurs in the engine rotation speed after time t01, and the drivability becomes worse.

As stated above, the secondary air supply control apparatus includes the three-way catalyst 23 disposed midway in the exhaust passage 22 of the internal combustion engine 10 and for purifying the exhaust gas, the secondary air supply mechanism 30 for supplying the secondary air into the exhaust passage 22 at the upstream side of the three-way catalyst 23, the A/F sensor 24 as the air-fuel ratio detection unit disposed in the exhaust passage 22 between the three-way catalyst 23 and the secondary air supply hole 31a and for detecting the air-fuel ratio in the exhaust gas, and the air-fuel ratio F/B control unit realized by the CPU 41 of the ECU 40 and for executing, when the specified air-fuel ratio F/B (feedback) control condition is established during the supply of the secondary air provided by the secondary air supply mechanism 30, the air-fuel ratio F/B control to cause the air-fuel ratio detected by the A/F sensor 24 to become coincident with the previously set target air-fuel ratio. Besides, the air-fuel ratio F/B control unit realized by the CPU 41 of the ECU 40 of the secondary air supply control apparatus of the internal combustion engine of the embodiment sets the initial value of the target air-fuel ratio at the start time of the execution of the air-fuel ratio F/B control to the air-fuel ratio detected by the A/F sensor 24 at this time, and gradually changes the subsequent target air-fuel ratio from this initial value to the specified air-fuel ratio.

That is, when the specified air-fuel ratio F/B control condition is established during the supply of the secondary air provided by the secondary air supply mechanism 30, the air-fuel ratio F/B control is executed to cause the air-fuel ratio detected by the A/F sensor 24 to become coincident with the target air-fuel ratio, the initial value of the target air-fuel ratio at the start time of the execution is made the air-fuel ratio detected by the A/F sensor 24 at this time and is set to the lean side, and the subsequent target air-fuel ratio is gradually changed until it becomes the stoichiometric air-fuel ratio as the specified air-fuel ratio from the initial value. By this, at the start time of the execution of the air-fuel ratio F/B control during the supply of the secondary air, the initial value of the target air-fuel ratio can be suitably set to the air-fuel ratio at the lean side detected by the A/F sensor 24 at this time, and then, the air-fuel ratio is gradually changed to the stoichiometric air-fuel ratio, so that the change in the engine rotation speed is suppressed and the drivability can be improved.

In the above embodiment, the secondary air supply mechanism 30 adopts such structure that the combination valve 34 is used, and the back pressure of the open/close valve 35 is switched between the atmospheric pressure and the intake pressure at the intake passage 11 side by the switching valve 38 disposed midway in the intake pressure introduction passage 37. However, in the case where the invention is carried out, it is not limited to this, for example, the intake pressure at the intake passage 11 side is not used, and an electromagnetic drive valve is disposed midway in the secondary air supply passage 31, and the electromagnetic drive valve may be opened/closed in synchronization with ON/OFF of the air pump 33.

Besides, in the above embodiment, the before-catalyst air-fuel ratio BCR detected by the A/F sensor 24 during the supply of the secondary air is set to the initial value of the target air-fuel ratio in the air-fuel ratio F/B control. However, in the case where the invention is carried out, it is not limited to this, and the initial value of the target air-fuel ratio in the air-fuel ratio F/B control can be more suitably set by taking the change of the before-catalyst air-fuel ratio into consideration.

That is, the actual before-catalyst air-fuel ratio detected by the A/F sensor 24 during the supply of the secondary air is repeatedly changed every burning cycle of each cylinder of the internal combustion engine 10. Accordingly, the initial value of the target air-fuel ratio in the air-fuel ratio F/B control during the supply of the secondary air is set to a minimum air-fuel ratio of the before-catalyst air-fuel ratio in a specified period, that is, the rich side value of the changing before-catalyst air-fuel ratio which appears to most faithfully reflect the combustion state of the internal combustion engine 10 at this time, so that the change in the engine rotation speed at the start time of the execution of the air-fuel ratio F/B control during the supply of the secondary air is suppressed, and the drivability can be improved.

The air-fuel ratio F/B control unit realized by the CPU 41 of the ECU 40 of the secondary air supply control apparatus of the internal combustion engine as stated above sets the initial value of the target air-fuel ratio at the start time of the execution of the air-fuel ratio F/B control to the minimum air-fuel ratio in the specified period detected by the A/F sensor 24 from the supply start of the secondary air, and gradually changes the subsequent target air-fuel ratio from the initial value to the stoichiometric air-fuel ratio as the specified air-fuel ratio. Since the initial value of the target air-fuel ratio can be set more suitably, the operation and effect of the foregoing embodiment can be obtained more stably.

Next, a second embodiment of the present invention will be described.

An internal combustion engine to which a secondary air supply control apparatus of an internal combustion engine is applied and its peripheral equipment are the same as those of the first embodiment shown in FIG. 1.

Figure 10A:
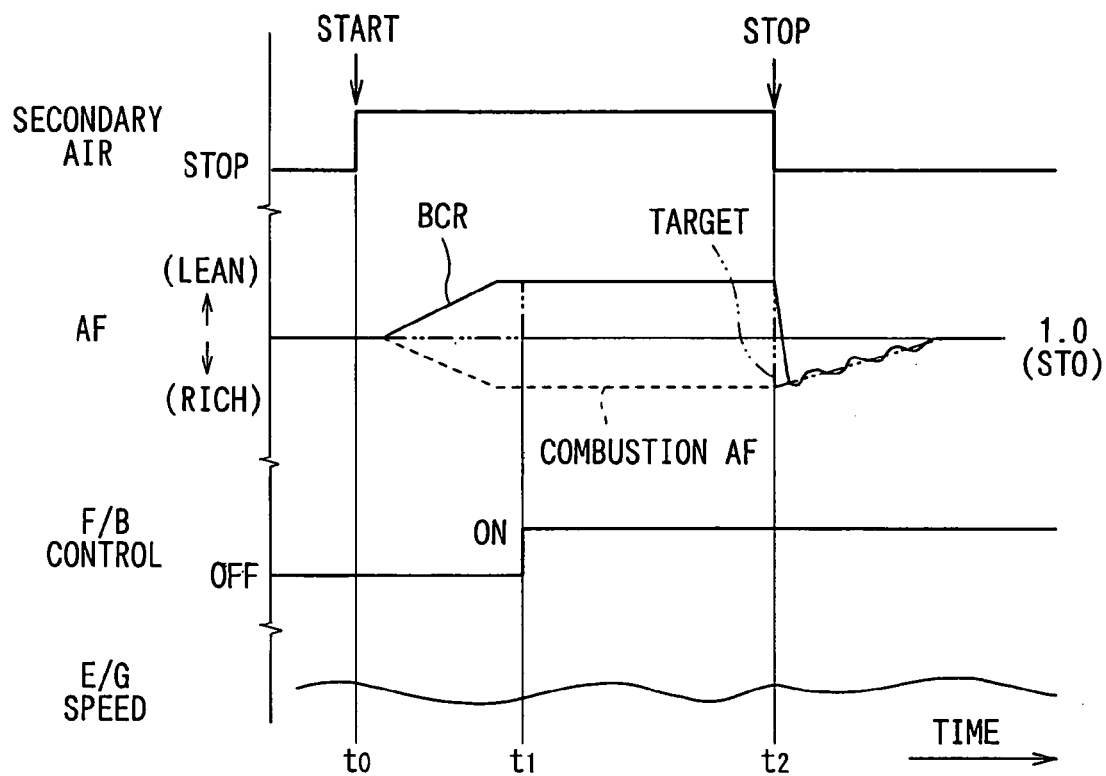
FIGS. 10A and 10B are time charts showing transition states of various sensor signals and various control amounts corresponding to the secondary air supply control of FIGS. 2 to 9, and a conventional secondary air supply control for comparison.
Figure 10B:
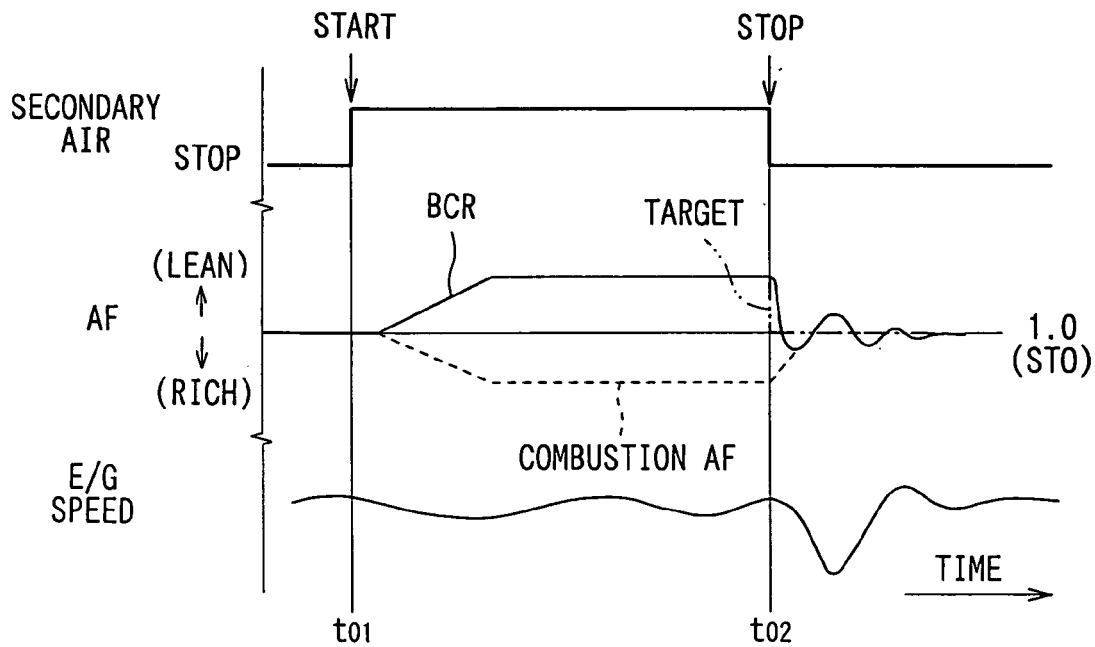

A processing procedure of a secondary air supply control by the CPU 41 of the ECU 40 used in the secondary air supply control apparatus of the internal combustion engine according to the second embodiment of the invention will be described based on the flowchart of FIG. 2 and with reference to FIGS. 10A and 10B. Here, FIG. 10A is a time chart showing transition states of various sensor signals and various control amounts corresponding to the secondary air supply control of this embodiment, and FIG. 10B is a time chart showing transition states of various sensor signals and various control amounts corresponding to a conventional secondary air supply control for comparison. Incidentally, this secondary air supply control routine is repeatedly executed by the CPU 41 at specified time intervals.

In FIG. 2, at step S101, it is judged whether a secondary air supply control condition for early warming up and activating the three-way catalyst 23 is established. This secondary air supply control condition is established when the cooling water temperature detected by the water temperature sensor 28 is a specified temperature or higher, the stop period of the internal combustion engine 10 from warm-up is short, or the intake air amount is relatively small. When the judgment condition of the step S101 is established, that is, the secondary air supply control condition is established, the procedure proceeds to step S102, the air pump 33 is turned ON (see a period of from time t0 to time t2 shown in FIG. 10A in which the secondary air is being supplied), and this routine is ended.

When the judgment condition of the step S101 is not established, that is, the secondary air supply control condition is not established, the procedure proceeds to step S103, the air pump 33 is turned OFF (see a period before time t0 and after time t2 shown in FIG. 10A in which the supply of the secondary air is stopped), and this routine is ended.

The processing of the fuel injection control by the CPU 41 of the ECU 40 is performed on the basis of the flowchart of FIG. 3 similarly to the first embodiment, and is repeatedly executed by the CPU 41 at specified time intervals.

Next, a processing procedure of an open loop control at the step S204 of the fuel injection control routine of FIG. 3 will be described based on the flowchart of FIG. 4 and with reference to FIGS. 10A and 10B.

In FIG. 4, at step S301, a basic fuel injection amount TP is calculated on the basis of the engine rotation speed and the intake air amount. Next, the procedure proceeds to step S302, and it is judged whether cold starting is performed. When the judgment condition of the step S302 is established, that is, when the cooling water temperature is low to be lower than a specified temperature, and the cold starting is performed, the procedure proceeds to step S303, and it is judged whether the air pump 33 is ON. When the judgment condition of the step S303 is established, that is, the air pump 33 is ON and the secondary air passes through the secondary air supply passage 31 and is supplied from the secondary air supply hole 31a into the exhaust passage 22 (time t0 to t2 shown in FIG. 10A), the procedure proceeds to step S304.

At the step S304, an air pump correction amount of the fuel injection amount on the basis of the supply of the secondary air from the air pump 33 is calculated. Next, the procedure proceeds to step S305, and an after-starting correction amount of the fuel injection amount is calculated on the basis of the engine rotation speed and the load. Next, the procedure proceeds to step S306, and a warm-up correction amount of the fuel injection amount is calculated on the basis of the cooling water temperature. Next, the procedure proceeds to step S307, and other correction amount 1 is calculated.

On the other hand, when the judgment condition of the step S303 is not established, that is, when the air pump 33 is OFF and the secondary air is not being supplied (before time t0 and after time t2 shown in FIG. 10A), the procedure proceeds to step S308, and the after-starting correction amount of the fuel injection amount is calculated on the basis of the engine rotation speed and the load. Next, the procedure proceeds to step S309, and the warm-up correction amount of the fuel injection amount is calculated on the basis of the cooling water temperature. Next, the procedure proceeds to step S310, and the other correction amount 1 is calculated on the basis of the other operation parameters of the internal combustion engine 10.

On the other hand, the judgment condition of the step S302 is not established, that is, the cooling water temperature is high to be the specified temperature or higher, and the cold starting is not performed, the procedure proceeds to step S311, and the other correction amount 2 is calculated on the basis of the other operation parameters of the internal combustion engine 10. After th e processing of the step S307, the step s310 or the step S311 is performed, the procedure proceeds to step S312, a final fuel injection amount TAU is calculated, and this routine is ended.

Next, a processing procedure of the air-fuel ratio F/B control at the step S205 of the fuel injection control routine of FIG. 3 will be described based on the flowchart of FIG. 5 and with reference to FIGS. 10A and 10B.

In FIG. 5, at step S401, an after-mentioned target air-fuel ratio setting processing is executed. Next, the procedure proceeds to step S402, the air-fuel ratio F/B control processing is executed for the target air-fuel ratio set at the step S401, and this routine is ended. In this air-fuel ratio F/B control processing, the fuel injection amount is adjusted so that an after-mention combustion air-fuel ratio as an air-fuel ratio which is estimated and calculated on the basis of at least one of the engine rotation speed of the internal combustion engine 10, the load, the intake air amount, the cooling water temperature and the after-starting elapsed time, is supplied to the internal combustion engine 10 and contributes to combustion is directed to the rich side and the lean side with respect to the target air-fuel ratio according to the rich dither coefficient and the lean dither coefficient set on the basis of the before-catalyst air-fuel ratio (see FIG. 10A) detected by the A/F sensor 24 and introduced to the three-way catalyst 23 as is commonly known.

Next, a processing procedure of the target air-fuel ratio setting at the step S401 of the air-fuel ratio F/B control routine of FIG. 5 will be described based on the flowchart of FIG. 6 and with reference to FIGS. 10A and 10B.

In FIG. 6, at step S501, it is judged whether the air pump 33 is turned OFF from the ON state. When the judgment condition of the step S501 is established, that is, when the air pump becomes ON→OFF and the supply of the secondary air from the air pump 33 is just ended, the procedure proceeds to step S502, and an APOFF flag indicating that the supply of the secondary air from the air pump 33 is just ended is set to "1". On the other hand, when the judgment condition of the step S501 is not established, that is, when the supply of the secondary air from the air pump 33 is not just ended, the step S502 is skipped.

Next, the procedure proceeds to step S503, and it is judged whether the APOFF flag is "1". When the judgment condition of the step S503 is established, that is, when the APOFF flag is "1" and the supply of the secondary air from the air pump 33 is just ended (time t2 shown in FIG. 10A), the procedure proceeds to step S504, and an after-mentioned target air-fuel ratio setting processing at the OFF time of the air pump is executed, and this routine is ended. On the other hand, the judgment condition of the step S503 is not established, that is, when the APOFF flag is "0" and the supply of the secondary air from the air pump 33 is not just ended (time t1 to time t2 shown in FIG. 10A), the procedure proceeds to step S505, a well-known normal target air-fuel ratio setting processing is executed, and this routine is ended.

Next, a processing procedure of the target air-fuel ratio setting at the OFF time of the air pump at the step S504 of the target air-fuel ratio setting routine of FIG. 6 and immediately after the end of the supply of the secondary air will be described based on a flowchart of FIG. 9 and with reference to FIGS. 8A and 8B.

Figure 9:
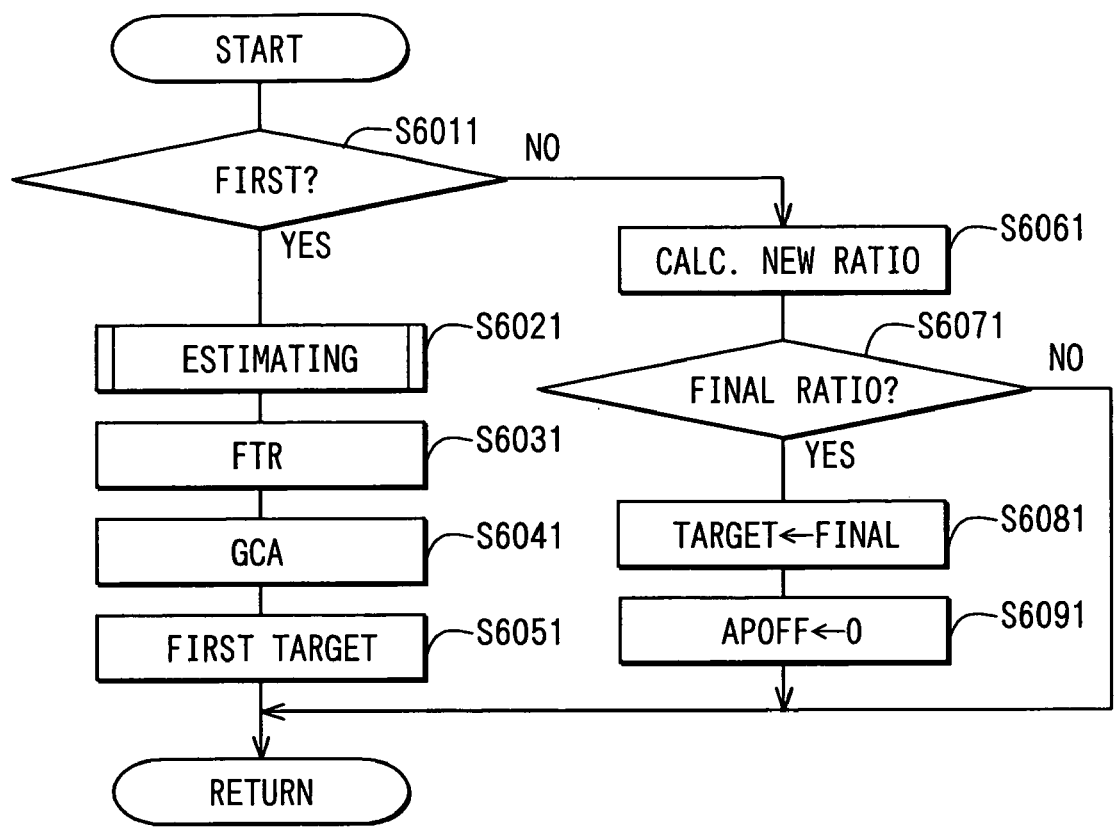
FIG. 9 is a flowchart showing a processing procedure of an air pump OFF time target air-fuel ratio setting in FIG. 6.

In FIG. 9, at step S6011, it is judged whether the air pump is OFF, the supply of the secondary air is just ended, and the first target air-fuel ratio setting is performed. When the judgment condition of the step S6011 is established, that is, when the first target air-fuel ratio setting is performed (time t2 shown in FIG. 10A), the procedure proceeds to step S6021, and a combustion air-fuel ratio estimate processing for estimating a combustion air-fuel ratio as an air-fuel ratio supplied to the internal combustion engine 10 and contributing to combustion is executed. This combustion air-fuel ratio is estimated and calculated on the basis of at least one of the engine rotation speed of the internal combustion engine 10, the load, the intake air amount, the cooling water temperature, and the after-starting elapsed time. Next, the procedure proceeds to step S6031, and the final target air-fuel ratio FTR is set to the stoichiometric air-fuel ratio.

Next, the procedure proceeds to step S6041, and a target air-fuel ratio gradual change amount GCA is calculated on the basis of a difference between the combustion air-fuel ratio estimated at the step S6021 as the initial value of the target air-fuel ratio and the stoichiometric air-fuel ratio set at the step S6031. Next, the procedure proceeds to step S6051, the combustion air-fuel ratio estimated at the step S6021 is made the first target air-fuel ratio at the OFF time of the air pump, and this routine is ended.

On the other hand, when the judgment condition of the step S6011 is not established, that is, when the first target air-fuel ratio setting is not performed (period of from time t2 shown in FIG. 10A to a time when the combustion air-fuel ratio becomes 1.0 (stoichiometric air-fuel ratio)), the procedure proceeds to step S6061, and a new target air-fuel ratio is calculated by adding the target air-fuel ratio gradual change amount calculated at the step S6041 to the last target air-fuel ratio. Next, the procedure proceeds to step S6071, and it is judged whether the target air-fuel ratio reaches the stoichiometric air-fuel ratio as the final target air-fuel ratio. When the judgment condition of the step S6071 is not established, that is, when the target air-fuel ratio has not yet reached the stoichiometric air-fuel ratio, this routine is ended.

On the other hand, when the judgment condition of the step S6071 is established, that is, when the target air-fuel ratio has reached the stoichiometric air-fuel ratio as the final target air-fuel ratio, the procedure proceeds to step S6081, and the final target air-fuel ratio is made the target air-fuel ratio. Next, the procedure proceeds to step S6091, the APOFF flag is set to "0", that is, it is indicated that the air-fuel ratio control is ended at the time immediately after the supply of the secondary air is ended, and this routine is ended.

In the conventional secondary air supply control shown in FIG. 10B, similarly to the foregoing embodiment, the secondary air is supplied in a period of from time t01 to time t02. However, immediately after the supply of the secondary air is ended at time t02, the target air-fuel ratio is set to 1.0 (stoichiometric air-fuel ratio). Thus, the combustion air-fuel ratio is immediately suddenly changed to the stoichiometric air-fuel ratio from time t02. Due to the sudden change of the combustion air-fuel ratio, there occurs a large change in the engine rotation speed after time t02, and the drivability becomes worse.

As stated above, the secondary air supply control apparatus of the internal combustion engine of this embodiment includes the three-way catalyst 23 disposed midway in the exhaust passage 22 of the internal combustion engine 10 and for purifying the exhaust gas, the secondary air supply mechanism 30 for supplying the secondary air into the exhaust passage 22 at the upstream side of the three-way catalyst 23, the A/F sensor 24 as the air-fuel ratio detection unit disposed in the exhaust passage 22 at the upstream side of the three-way catalyst 23 and at the downstream side of the secondary air supply hole 31a of the secondary air supply passage 31 and for detecting the air-fuel ratio in the exhaust gas, the air-fuel ratio estimation unit realized by the CPU 41 of the ECU 40 and for estimating the air-fuel ratio supplied to the internal combustion engine 10 on the basis of various operation parameters, and the target air-fuel ratio setting unit realized by the CPU 41 of the ECU 40 and for setting the initial value of the target air-fuel ratio for the air-fuel ratio detected by the A/F sensor 24 in the air-fuel ratio F/B (feedback) control immediately after the end of the supply of the secondary air provided by the secondary air supply mechanism 30 to the air-fuel ratio estimated by the air-fuel ratio estimation unit at this time. Besides, in the secondary air supply control apparatus of the internal combustion engine of this embodiment, the various operation parameters include at least one of the engine rotation speed, the load, the intake air amount, the cooling water temperature and the after-starting elapsed time.

That is, the initial value of the target air-fuel ratio for the air-fuel ratio detected by the A/F sensor 24 in the air-fuel ratio F/B control immediately after the end of the supply of the secondary air provided by the secondary air supply mechanism 30 is set to the air-fuel ratio which is estimated on the basis of the various operation parameters of the internal combustion engine 10, is supplied to the internal combustion engine 10 and contributes to the combustion, and the subsequent target air-fuel ratio is gradually changed from the initial value to the stoichiometric air-fuel ratio. By this, in the air-fuel ratio F/B control immediately after the end of the supply of the secondary air, the initial value of the target air-fuel ratio can be suitably set, and then, it is gradually changed to the stoichiometric air-fuel ratio, so that the change in the engine rotation speed is suppressed and the drivability can be improved.

Next, a modified example of the processing procedure of the air pump OFF time target air-fuel ratio setting of FIG. 9 in the foregoing embodiment will be described based on a flowchart of FIG. 11 and with reference to FIG. 13. Here, FIG. 13 is a time chart showing transition states of various sensor signals and various control amounts corresponding to a secondary air supply control of this modified example.

Figure 11:
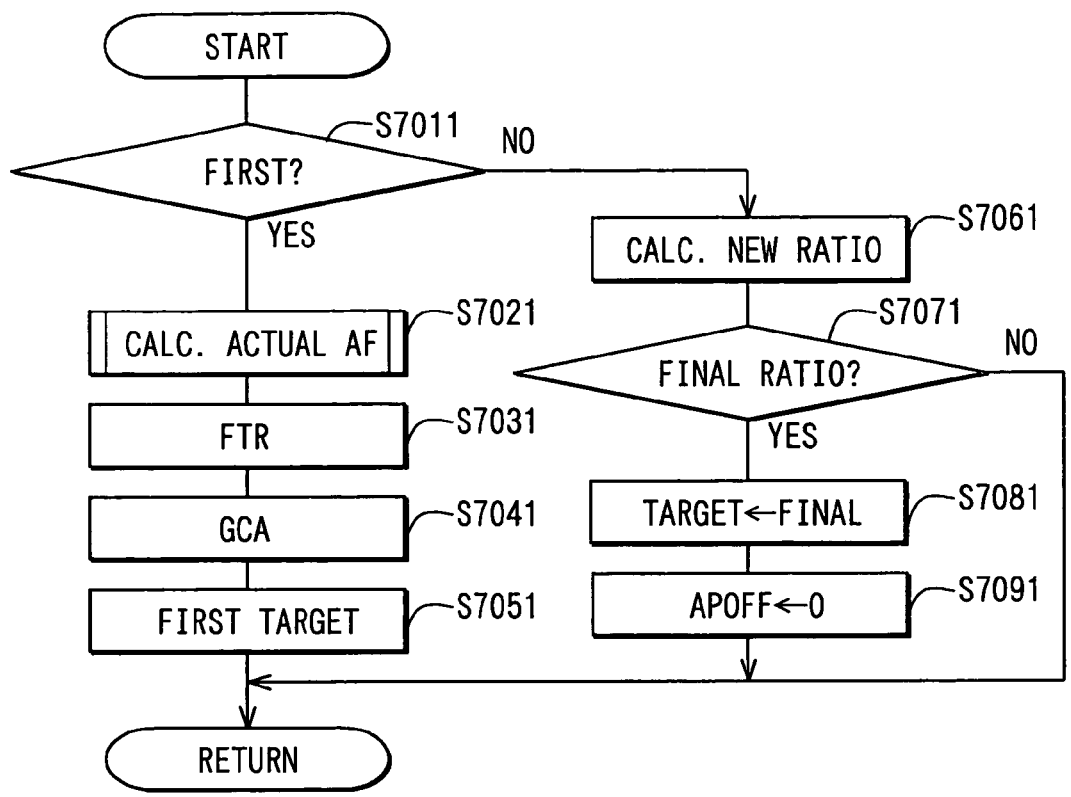
FIG. 11 is a flowchart showing a modified example of the processing procedure of the air pump OFF time target air-fuel ratio setting of FIG. 9.

In FIG. 11, since step S7011, step S7031, step S7041 and step S7061 to step S7091 correspond to the step S6011, the step S6031, the step S6041 and the step S6061 to the step S6091 of the foregoing embodiment, their detailed description will be omitted. Here, at step S7021, an after-mentioned actual air-fuel ratio calculation processing is executed. Besides, at step S7051, the actual air-fuel ratio (see actual air-fuel ratio shown at time t3 of FIG. 13) calculated at the step S7021 is made an initial target air-fuel ratio at the air pump OFF time, and this routine is ended.

Next, a processing procedure of the actual air-fuel ratio calculation at the step S7021 of the air pump OFF time target air-fuel ratio setting will be described based on a flowchart of FIG. 12 and with reference to FIG. 13.

Figure 12:
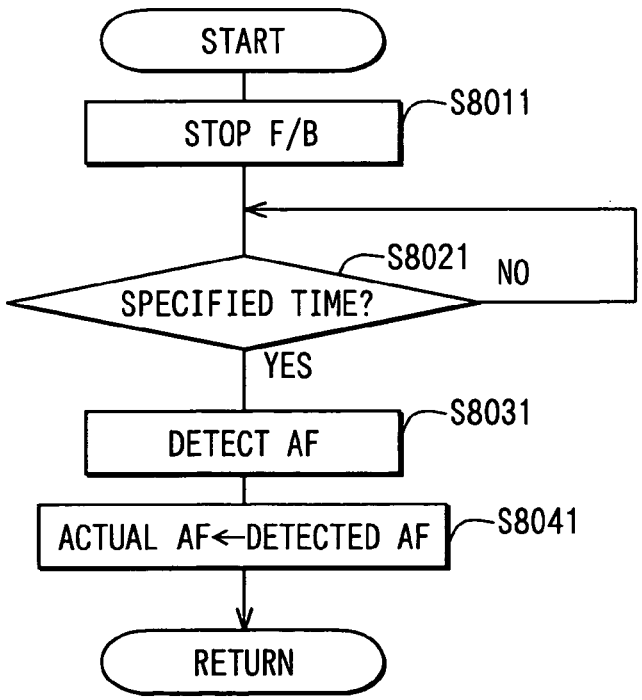
FIG. 12 is a flowchart showing a processing procedure of real air-fuel ratio calculation in FIG. 11.
Figure 13:
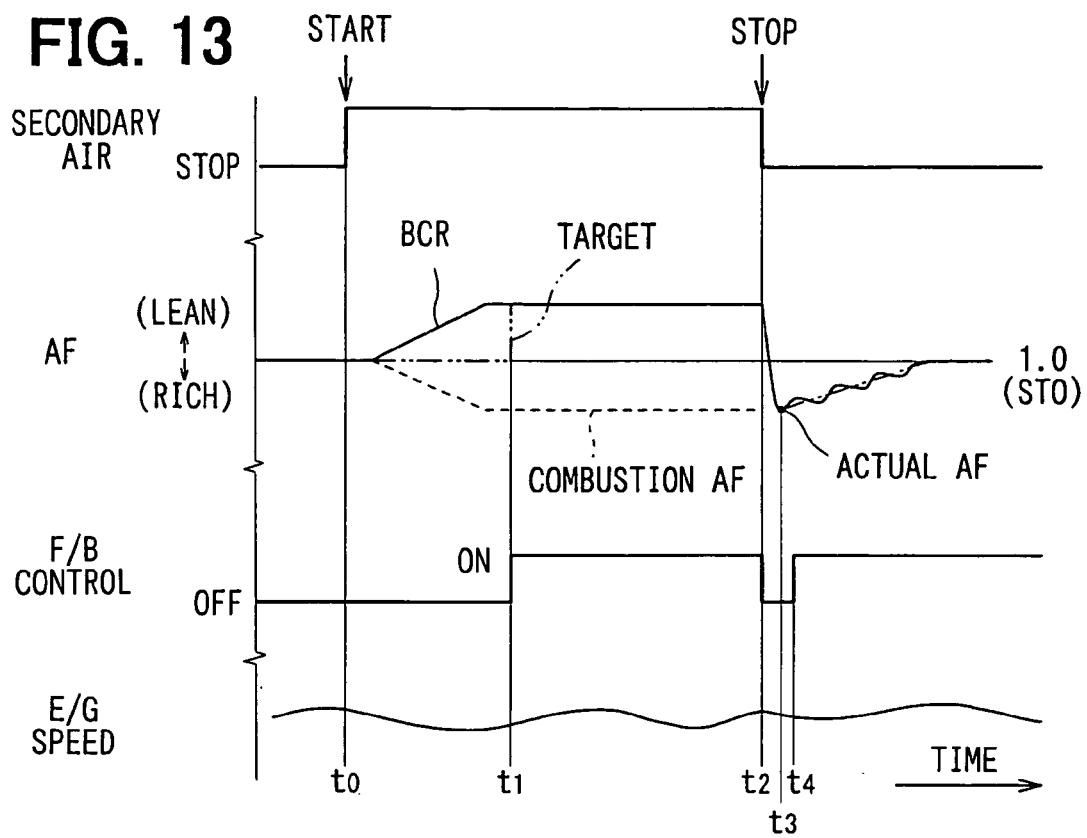
FIG. 13 is a time chart showing transition states of various sensor signals and various control amounts corresponding to a modified example of the secondary air supply control of FIGS. 11 and 12.

In FIG. 12, at a step S8011, the air-fuel ratio F/B control is stopped to be suspended (time t2 shown in FIG. 13). Next, the procedure proceeds to step S8021, and it is judged whether a specified time (period of from time t2 to time t3 shown in FIG. 13) has passed. As this specified time, a period in which after the secondary air supply is ended, the air-fuel ratio becomes stable and detectable by the A/F sensor 24 is previously set. When the specified time has passed at the step S8021, the procedure proceeds to step S8031, and an air-fuel ratio detection value detected by the A/F sensor 24 is read in. Next, the procedure proceeds to step S8041, the air-fuel ratio detection value read in at the step S8031 is made the actual air-fuel ratio, and this routine is ended. Incidentally, as described above, although the combustion air-fuel ratio is based on the estimate calculation, the actual air-fuel ratio is the air-fuel ratio detection value actually detected by the A/F sensor 24. Besides, as the stop time in the air-fuel ratio F/B control at the step S8011, a minimum time (period of from time t2 to time t4 shown in FIG. 13) is set which is longer than the specified time and in which the air-fuel ratio detection value from the A/F sensor 24 can be read in.

As stated above, the secondary air supply control apparatus of the internal combustion engine of this modified example includes the three-way catalyst 23 disposed midway in the exhaust passage 22 of the internal combustion engine 10 and for purifying the exhaust gas, the secondary air supply mechanism 30 for supplying the secondary air into the exhaust passage 22 at the upstream side of the three-way catalyst 23, the A/F sensor 24 as the air-fuel ratio detection unit disposed in the exhaust passage 22 at the upstream side of the three-way catalyst 23 and at the downstream side of the secondary air supply hole 31a of the secondary air supply passage 31 and for detecting the air-fuel ratio in the exhaust gas, and the target air-fuel ratio setting unit realized by the CPU 41 of the ECU 40 and for setting the initial value of the target air-fuel ratio for the air-fuel ratio detected by the A/F sensor 24 in the air-fuel ratio F/B (feedback) control immediately after the end of the supply of the secondary air provided by the secondary air supply mechanism 30 to the actual air-fuel ratio as the air-fuel ratio detection value detected by the A/F sensor 24 after the specified time has passed since the air-fuel ratio F/B control was suspended, and for gradually changing the subsequent target air-fuel ratio from the initial value to the stoichiometric air-fuel ratio.

That is, the initial value of the target air-fuel ratio for the air-fuel ratio detected by the A/F sensor 24 in the air-fuel ratio F/B control immediately after the end of the supply of the secondary air provided by the secondary air supply mechanism 30 is set to the actual air-fuel ratio detected by the A/F sensor 24 after the specified time has passed since the air-fuel ratio F/B control was suspended, and the subsequent target air-fuel ratio is gradually changed from the initial value to the stoichiometric air-fuel ratio. By this, in the air-fuel ratio F/B control immediately after the end of the supply of the secondary air, the initial value of the target air-fuel ratio can be suitably set, and then, it is gradually changed to the stoichiometric air-fuel ratio, so that the change in the engine rotation speed is suppressed and the drivability can be improved.

Hereinafter, a third embodiment of the present invention will be described.

An internal combustion engine to which a secondary air supply control apparatus of an internal combustion engine is applied and its peripheral equipment are the same as those of the first embodiment shown in FIG. 1.

Figure 16A:
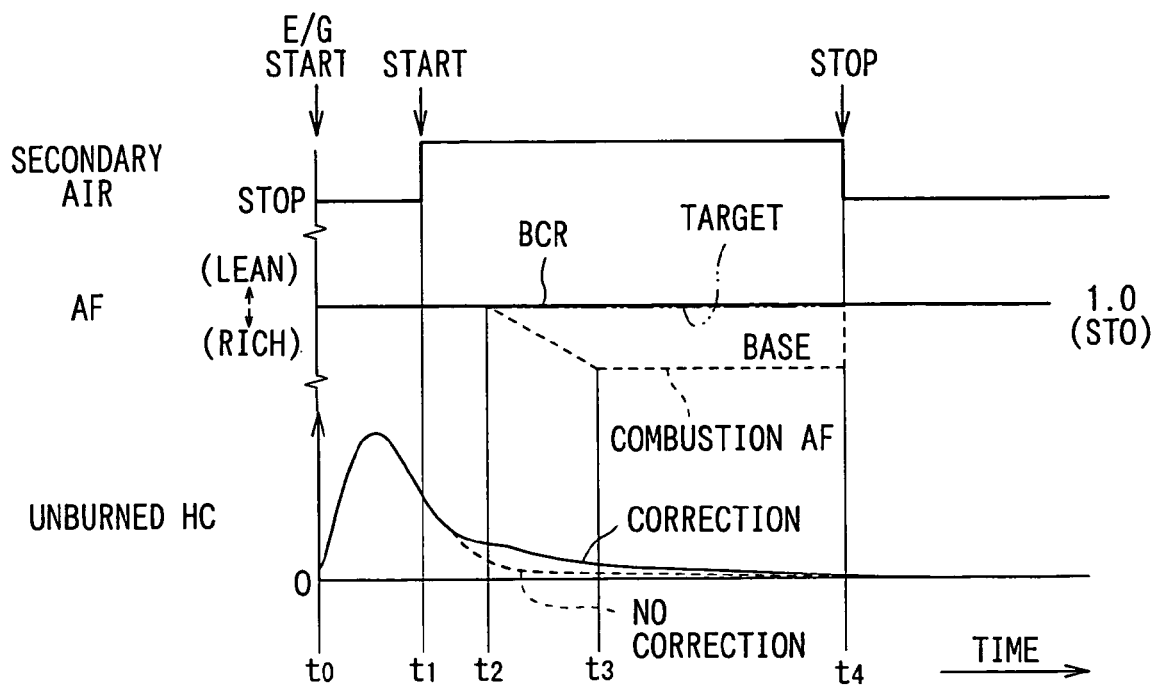
FIGS. 16A and 16B are time charts showing transition states of various sensor signals and various control amounts corresponding to the secondary air supply control, and corresponding to a case for comparison in which a fuel injection amount to an internal combustion engine is simply corrected to be increased during the supply of the secondary air.
Figure 16B:
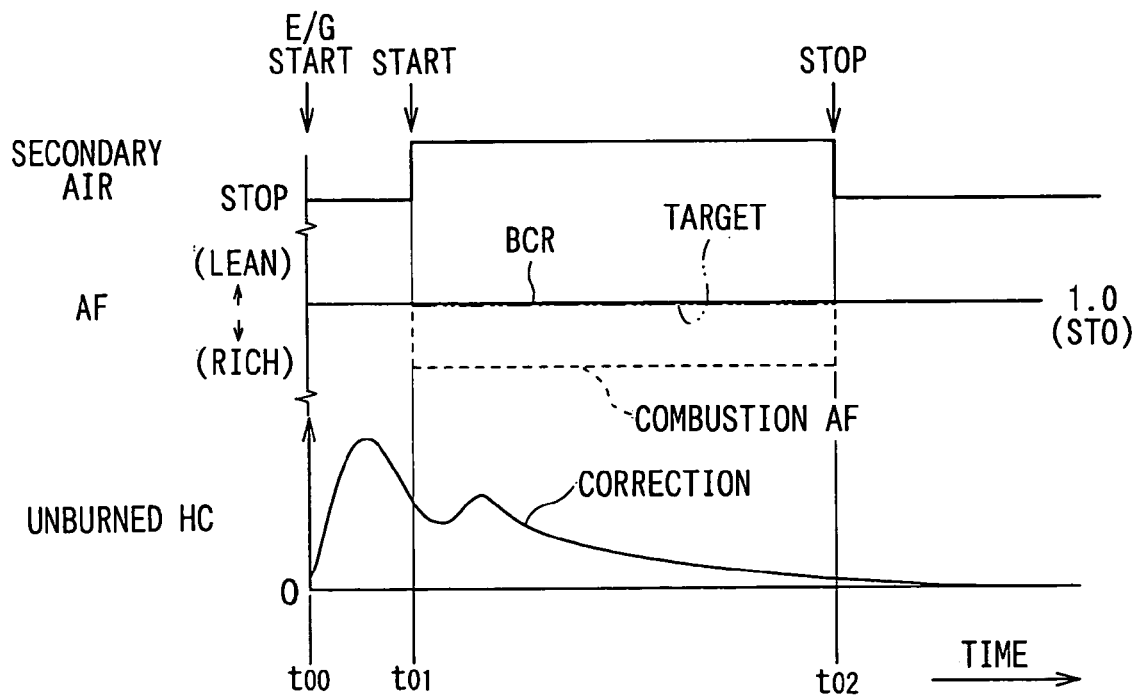

A processing procedure of a secondary air supply control by the CPU 41 of the ECU 40 used in the secondary air supply control apparatus of the internal combustion engine according to the third embodiment of the invention will be described based on the flowchart of FIG. 2 and with reference to FIGS. 16A and 16B. Here, FIG. 16A is a time chart showing transition states of various sensor signals and various control amounts corresponding to the secondary air supply control of this embodiment, and FIG. 16B is a time chart showing, for comparison, transition states of various sensor signals and various control amounts at the time when an amount increasing correction of a fuel injection amount to the internal combustion engine is simply performed during the supply of the secondary air. Incidentally, this secondary air supply control routine is repeatedly executed by the CPU 41 at specified time intervals.

In FIG. 2, at step S101, it is judged whether the secondary air supply control condition for early warming up and activating the three-way catalyst 23 is established. The secondary air supply control condition is established when the cooling water temperature detected by the water temperature sensor 28 is a specified temperature or higher, the stop period of the internal combustion engine 10 after warm-up is short, or the intake air amount is relatively small. When the judgment condition of the step S101 is established, that is, the secondary air supply control condition is established, the procedure proceeds to step S102, the air pump 33 is turned ON (see a period of from time t1 to time t4 shown in FIG. 16A in which the secondary air is being supplied), and this routine is ended.

When the judgment condition of the step S101 is not established, that is, the secondary air supply control condition is not established, the procedure proceeds to step S103, the air pump 33 is turned OFF (see a period before time t1 and after time t4 shown in FIG. 16A in which the supply of the secondary air is stopped), and this routine is ended.

A processing of a fuel injection control by the CPU 41 is performed on the basis of the flowchart of FIG. 3 similarly to the first embodiment, and is repeatedly executed by the CPU 41 at specified time intervals.

Next, a processing procedure of an open loop control at step S204 of the fuel injection control routine of FIG. 3 will be described based on a flowchart of FIG. 14. Incidentally, this routine corresponds to a case where irrespective of ON/OFF of the air pump 33, the amount increasing correction of the fuel injection amount to the internal combustion engine 10 is not performed during the supply of the secondary air as well as at the initial stage of the supply of the secondary air, and unburned HC (hydrocarbon) from the internal combustion engine 10 at this time is shown in FIG. 16A by a broken line indicating a case without the fuel injection amount increasing correction.

Figure 14:
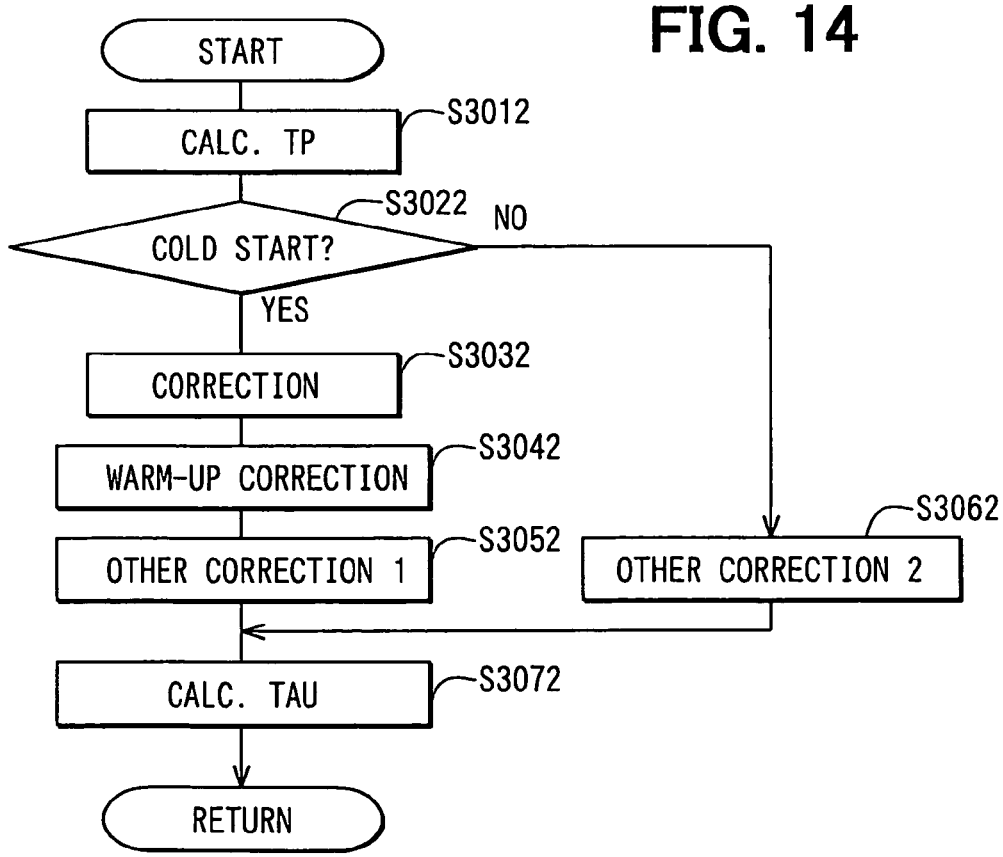
FIG. 14 is a flowchart showing a processing procedure of an open loop control in FIG. 3.

In FIG. 14, at step S3012, a basic fuel injection amount TP is calculated on the basis of the engine rotation speed and the intake air amount. Next, the procedure proceeds to step S3022, and it is judged whether cold starting is performed. When the judgment condition of the step S3022 is established, that is, when the cooling water temperature is low to be lower than a specified temperature and the cold starting is performed, the procedure proceeds to step S3032, and an after-starting correction amount of the fuel injection amount is calculated on the basis of the engine rotation speed and the load. Next, the procedure proceeds to step S3042, and a warm-up correction amount of the fuel injection amount is calculated on the basis of the cooling water temperature. Next, the procedure proceeds to step S3052, and other correction amount 1 is calculated.

On the other hand, when the judgment condition of the step S3022 is not established, that is, when the cooling water temperature is high to be the specified temperature or higher and the cold starting is not performed, the procedure proceeds to step S3062, and other correction amount 2 is calculated on the basis of the other operation parameters of the internal combustion engine 10. After the processing of the step S3052 or the step S3062, the procedure proceeds to step S3072, the final fuel injection amount TAU is calculated, and this routine is ended.

As stated above, in the case where irrespective of ON/OFF of the air pump 33, the amount increasing correction of the fuel injection amount to the internal combustion engine 10 is not performed during the supply of the secondary air as well as at the initial stage of the supply of the secondary air, the increase in the unburned HC from the internal combustion engine 10 is not caused as indicated by the broken line in FIG. 16A. Besides, since the change in the engine rotation speed does not occur, the drivability does not become worse.

Next, a processing procedure of the air-fuel ratio F/B control at the step S205 of the fuel injection control routine of FIG. 3 will be described based on the flowchart of FIG. 5 and with reference to FIGS. 16A and 16B.

In FIG. 5, at step S401, a target air-fuel ratio is set to 1.0 (stoichiometric air-fuel ratio) in a-target air-fuel ratio setting processing. Next, the procedure proceeds to step S402, the air-fuel ratio F/B control processing is executed for the target air-fuel ratio set at the step S401, and this routine is ended. In this air-fuel ratio F/B control processing, as is commonly known, the fuel injection amount is adjusted so that the combustion air-fuel ratio as the air-fuel ratio which is estimated and calculated on the basis of at least one of the engine rotation speed of the internal combustion engine 10, the load, the intake air amount, the cooling water temperature and the after-starting elapsed time, is supplied to the internal combustion engine 10 and contributes to the combustion is directed to the rich side and the lean side with respect to the target air-fuel ratio according to the rich dither coefficient and the lean dither coefficient set on the basis of the before-catalyst air-fuel ratio (see FIG. 16A) detected by the A/F sensor 24 and introduced to the three-way catalyst 23.

As stated above, the secondary air supply control apparatus of the internal combustion engine of this embodiment includes the three-way catalyst 23 disposed midway in the exhaust passage 22 of the internal combustion engine 10 and for purifying the exhaust gas, the secondary air supply mechanism 30 for supplying the secondary air into the exhaust passage 22 at the upstream side of the three-way catalyst 23, and the fuel supply control unit realized by the CPU 41 of the ECU 40 and for inhibiting the increase in the fuel injection amount to the internal combustion engine 10 during the supply of the secondary air provided by the secondary air supply mechanism 30. That is, the amount increasing correction of the fuel injection amount to the internal combustion engine 10 is not performed during the supply of the secondary air provided by the secondary air supply mechanism 30, so that the increase of the unburned HC from the internal combustion engine 10 can be prevented. Besides, naturally, since a sudden change in the air-fuel ratio supplied to the internal combustion engine is not caused, it is possible to prevent the drivability from becoming worse due to the change in the engine rotation speed.

Next, a modified example of the processing procedure of the open loop control at the step S204 of the fuel injection control routine of FIG. 3 in the foregoing embodiment will be described based on the flowchart of FIG. 4 and with reference to FIGS. 16A and 16B. Incidentally, this routine corresponds to the case where the air pump 33 is ON and the amount increasing correction of the fuel injection amount to the internal combustion engine 10 is performed during the supply of the secondary air, and the unburned HC from the internal combustion engine 10 at this time is shown in FIG. 16A by a solid line indicating the case with the fuel injection amount increasing correction.

In FIG. 4, at step S301, a basic fuel injection amount TP is calculated on the basis of the engine rotation speed and the intake air amount. Next, the procedure proceeds to step S302, and it is judged whether cold starting is perform ed. When the judgment condition of the step S302 is established, that is, the cooling water temperature is low to be lower than a specified temperature and the cold starting is performed, the procedure proceeds to step S303, and it is judged whether the air pump 33 is ON. When the judgment condition of the step S303 is established, that is, the air pump 33 is ON and the secondary air passes through the secondary air supply passage 31 and is supplied from the secondary air supply hole 31a into the exhaust passage 22 (time t1 to t4 shown in FIG. 16A), the procedure proceeds to step S304.

At the step S304, an air pump correction amount of the fuel injection amount is calculated on the basis of the secondary air supply from the air pump 33. Next, the procedure proceeds to step S305, an after-starting correction amount of the fuel injection amount is calculated on the basis of the engine rotation speed and the load. Next, the procedure proceeds to step S306, and a warm-up correction amount of the fuel injection amount is calculated on the basis of the cooling water temperature. Next, the procedure proceeds to step S307, and other correction amount 1 is calculated.

On the other hand, when the judgment condition of the step S303 is not established, that is, when the air pump 33 is OFF and the secondary air is not being supplied (before time t1 and after time t4 shown in FIG. 16A), the procedure proceeds to step S308, and an after-starting correction amount of the fuel injection amount is calculated on the basis of the engine rotation speed and the load. Next, the procedure proceeds to step S309, and a warm-up correction amount of the fuel injection amount is calculated on the basis of the cooling water temperature. Next, the procedure proceeds to step 310, and other correction amount 1 is calculated on the basis of the other operation parameters of the internal combustion engine 10.

On the other hand, when the judgment condition of the step S302 is not established, that is, the cooling water temperature is high to be the specified temperature or higher and the cold starting is not performed, the procedure proceeds to step S311, and other correction amount 2 is calculated on the basis of the other operation parameters of the internal combustion engine 10. After the processing of the step S307, the step s310 or the step S311, the procedure proceeds to step S312, the final fuel injection amount TAU is calculated, and this routine is ended.

Next, a processing procedure of air pump correction amount calculation of the fuel injection amount at the step S304 of the open loop control routine of FIG. 4 will be described based on a flowchart of FIG. 15 and with reference to FIGS. 16A and 16B.

Figure 15:
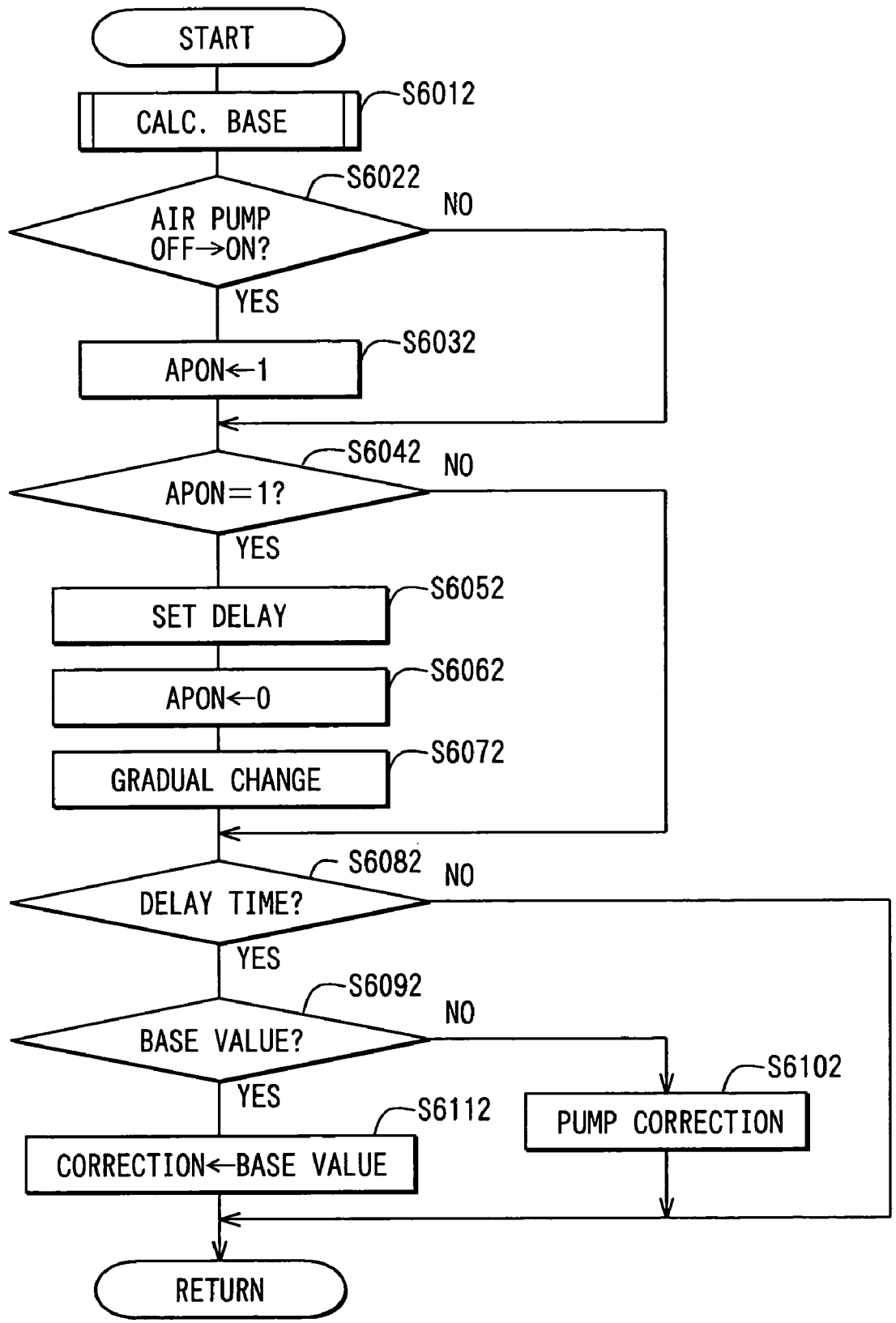
FIG. 15 is a flowchart showing a processing procedure of air pump correction amount calculation in FIG. 4.

In FIG. 15, first, at step S6012, a calculation processing of a BASE value is executed. This BASE value is a final attained value of a combustion air-fuel ratio as an air-fuel ratio which is estimated and calculated while the engine rotation speed of the internal combustion engine 10 and the intake air amount are made parameters, is supplied to the internal combustion engine 10 and contributes to the combustion (see the BASE value shown in FIG. 16A). Next, the procedure proceeds to step S6022, and it is judged whether the air pump 33 becomes ON from an OFF state. When the judgment condition of the step S6022 is established, that is, when the air pump 33 has just become OFF→ON, the procedure proceeds to step S6032, and an air pump ON immediate flag APON is set to "1". On the other hand, the judgment condition of the step S6022 is not established, that is, when the air pump 33 has not just become OFF→ON, the step S6032 is skipped.

Next, the procedure proceeds to step S6042, and it is judged whether the air pump ON immediate flag APON is "1". When the judgment condition of the step S6042 is established, that is, when the air pump ON immediate flag APON is "1", the procedure proceeds to step S6052, and a delay time is set. This delay time is a time provided before the change of the combustion air-fuel ratio is started, so that un burned HC from the internal combustion engine 10 is not increased immediately after the air pump 33 becomes ON from the OFF state, and is set on the basis of the intake air temperature and the cooling water temperature of the internal combustion engine 10.

Next, the procedure proceeds to step S6062, and the air pump ON immediate flag APON is reset to "0". Next, the procedure proceeds to step S6072, and a gradual change amount is calculated while for example, the cooling water temperature of the internal combustion engine 10 is made a parameter. This gradual change amount is for gradually changing the combustion air-fuel ratio stepwise so that the combustion air-fuel ratio in accordance with the amount increasing correction of the fuel injection amount to the internal combustion engine 10 is not suddenly set to the BASE value. By this, while the amount increasing correction of the fuel injection amount to the internal combustion engine 10 is performed, the unburned HC from the internal combustion engine 10 can be reduced. On the other hand, when the judgment condition of the step S6042 is not established, that is, when the air pump ON immediate flag APON is "0", the step S6052 to the step S6072 are skipped.

Next, the procedure proceeds to step S6082, and it is judged whether the delay time set at the step S6052 has passed. When the judgment condition of the step S6082 is not established, that is, the delay time has not passed, this routine is ended without doing anything. On the other hand, when the judgment condition of the step S6082 is established, that is, when the delay time has passed, the procedure proceeds to step S6092, and it is judged whether the air pump correction amount reaches the BASE value. When the judgment condition of the step S6092 is not established, that is, when the air pump correction amount does not reach the BASE value, the procedure proceeds to step S6102, a new air pump correction amount is obtained by adding the gradual change amount calculated at the step S6072 to the last air pump correction amount, and this routine is ended. On the other hand, when the judgment condition of the step S6092 is established, that is, when the air pump correction amount reaches the BASE value, the procedure proceeds to step S6112, the BASE value is made the air pump correction amount, and this routine is ended.

As described above, when the amount increasing correction of the fuel injection amount to the internal combustion engine 10 is performed, and when the air pump 33 is ON and the secondary air is being supplied, the specified delay time (period of from time t1 to time t2 shown in FIG. 16A) from the supply start of the secondary air is provided, and after this, the air pump correction amount is gradually changed until the combustion air-fuel ratio in accordance with the amount increasing correction of the fuel injection amount to the internal combustion engine 10 reaches the BASE value (period of from time t2 to time t3 shown in FIG. 16A), and as shown by the solid line in FIG. 16A, the unburned HC from the internal combustion engine 10 during the supply of the secondary air as well as at the initial stage of the supply of the secondary air can be reduced. Besides, since the sudden change in the combustion air-fuel ratio does not occur during the supply of the secondary air as well as at the initial stage of the supply of the secondary air, the change in the engine rotation speed is suppressed and the drivability can be improved.

Incidentally, in the secondary air supply control shown in FIG. 16B, the secondary air is supplied in the period of from time t01 to time t02 which is the same period as that of the foregoing modified example. However, immediately after the secondary air is supplied at time t01, the combustion air-fuel ratio in accordance with the amount increasing correction of the fuel injection amount to the internal combustion engine is immediately changed to the BASE value shown in FIG. 16A. It is understood that due to the sudden change in the combustion air-fuel ratio, the unburned HC from the internal combustion engine is increased during the supply of the secondary air as well as at the initial stage of the supply of the secondary air. Besides, by the sudden change in the combustion air-fuel ratio, a large change occurs in the engine rotation speed, and the drivability also becomes worse.

As stated above, the secondary air supply control apparatus of the internal combustion engine of this modified example includes the three-way catalyst 23 disposed midway in the exhaust passage 22 of the internal combustion engine 10 and for purifying the exhaust gas, the secondary air supply mechanism 30 for supplying the secondary air into the exhaust passage 22 at the upstream side of the three-way catalyst 23, the A/F sensor 24 as the air-fuel ratio detection unit disposed in the exhaust passage 22 at the upstream side of the three-way catalyst 23 and at the downstream side of the secondary air supply hole 31a of the secondary air supply passage 31 and for detecting the air-fuel ratio in the exhaust gas, and the fuel supply control unit realized by the CPU 41 of the ECU 40 and for setting, when the fuel injection amount to the internal combustion engine 10 is increased to maintain the air-fuel ratio detected by the A/F sensor 24 during the supply of the secondary air provided by the secondary air supply mechanism 30, the specified delay time from the supply start of the secondary air for the increase in the amount. Besides, the fuel supply control unit realized by the CPU 41 of the ECU 40 of the secondary air supply control apparatus of the internal combustion engine of this modified example gradually changes the fuel injection amount until the increase in the amount is attained.

That is, when the fuel injection amount to the internal combustion engine 10 is increased so as to maintain the before-catalyst air-fuel ratio introduced to the three-way catalyst 23 as the air-fuel ratio detected by the A/F sensor 24 during the supply of the secondary air provided by the secondary air supply mechanism 30, the specified delay time from the supply start of the secondary air is set for the increase in the amount, and the fuel injection amount is gradually changed until the increase in the amount is attained. By this, it is possible to reduce the unburned HC from the internal combustion engine 10 in accordance with the amount increasing correction of the fuel injection amount to the internal combustion engine 10 during the supply of the secondary air as well as at the initial stage of the supply of the secondary air, and the early warm-up of the three-way catalyst 23 can be realized while the emission is improved. Besides, the change in the engine rotation speed in accordance with the amount increasing correction is suppressed and the drivability can be improved.

Next, a fourth embodiment of the present invention will be described.

An internal combustion engine to which a secondary air supply control apparatus of an internal combustion engine is applied and its peripheral equipment are the same as those of the first embodiment shown in FIG. 1.

Figure 18A:
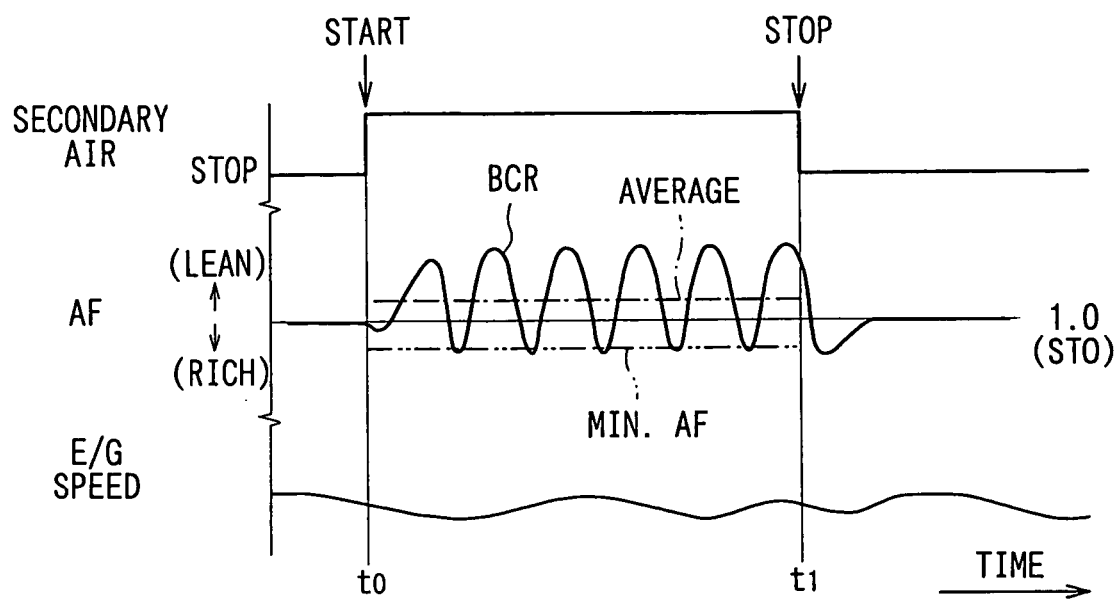
FIGS. 18A and 18B are time charts showing transition states of various sensor signals and various control amounts corresponding to the secondary air supply control, and corresponding to a secondary air supply control for comparison in which an air-fuel ratio F/B control is executed by using a before-catalyst air-fuel ratio as it is during the supply of the secondary air.
Figure 18B:
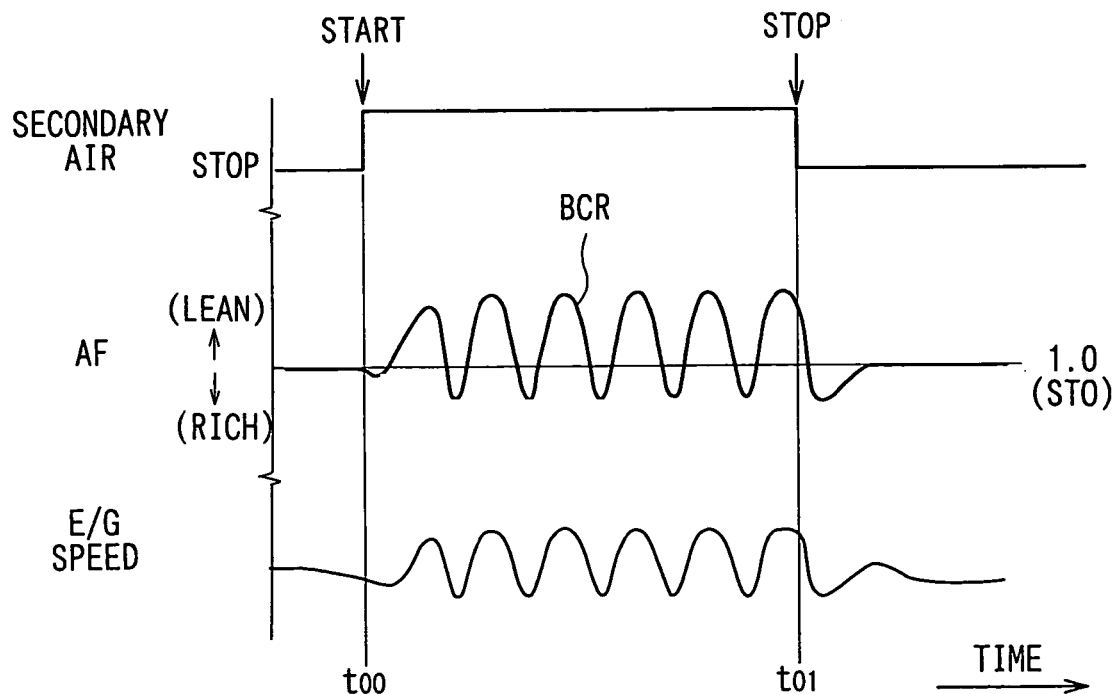

A processing procedure of a secondary air supply control by the CPU 41 of the ECU 40 used in the secondary air supply control apparatus of the internal combustion engine according to the fourth embodiment of the invention will be described based on the flowchart of FIG. 2 and with reference to FIGS. 18A and 18B. Here, FIG. 18A is a time chart showing transition states of various sensor signals and various control amounts corresponding to the secondary air supply control of this embodiment, and FIG. 18B is a time chart showing transition states of various sensor signals and various control amounts corresponding to a secondary air supply control for comparison in which an air-fuel ratio feedback control is executed by using a before-catalyst air-fuel ratio introduced to the three-way catalyst 23 and detected by the A/F sensor 24 during the supply of the secondary air as it is. Incidentally, this secondary air supply control routine is repeatedly executed by the CPU 41 at specified time intervals.

In FIG. 2, at step S101, it is judged whether the secondary air supply control condition for early warming up and activating the three-way catalyst 23 is established. This secondary air supply control condition is established when the cooling water temperature detected by the water temperature sensor 28 is a specified temperature or higher, the stop period from the end of warm-up of the internal combustion engine 10 is short, or the intake air amount is relatively small. When the judgment condition of the step S101 is established, that is, the secondary air supply control condition is established, the procedure proceeds to step S102, the air pump 33 is turned ON (see a period of from time t0 to time t1 shown in FIG. 18A in which the secondary air is being supplied), and this routine is ended.

When the judgment condition of the step S101 is not established, that is, when the secondary air supply control condition is not established, the procedure proceeds to step S103, the air pump 33 is turned OFF (see a period before time t0 and after time t1 shown in FIG. 18A in which the supply of the secondary air is stopped), and this routine is ended.

A processing of a fuel injection control by the CPU 41 of the ECU 40 is performed based on the flowchart of FIG. 3 similarly to the first embodiment, and is repeatedly executed by the CPU 41 at specified time intervals.

When the judgment condition of the step S203 is established, that is, when the A/F sensor 24 is activated, the operation state of the internal combustion engine 10 is in the steady state, and the air-fuel ratio F/B control condition is established (in this embodiment, the same time t0 as the supply start of the secondary air and the subsequent time shown in FIG. 18A), the procedure proceeds to step S205, an after-mentioned air-fuel ratio F/B control processing is executed, and this routine is ended. Incidentally, in this embodiment, it is assumed that the air-fuel ratio F/B control condition is established at the same time t0 as the supply start of the secondary air and the subsequent time shown in FIG. 18A.

Next, a processing procedure of an open loop control at the step S204 of the fuel injection control routine of FIG. 3 will be described based on the flowchart of FIG. 4 and with reference to FIGS. 18A and 18B.

In FIG. 4, at step S301, a basic fuel injection amount TP is calculated on the basis of the engine rotation speed and the intake air amount. Next, the procedure proceeds to step S302, and it is judged whether cold starting is performed. When the judgment condition of the step S302 is established, that is, when the cooling water temperature is low to be lower than a specified temperature and the cold starting is performed, the procedure proceeds to step S303, and it is judged whether the air pump 33 is ON. When the judgment condition of the step S303 is established, that is, when the air pump 33 is ON and the secondary air passes through the secondary air supply passage 31 and is supplied from the secondary air supply hole 31a to the exhaust passage 22, the procedure proceeds to step S304.

At the step S304, an air pump correction amount of the fuel injection amount based on the supply of the secondary air from the air pump 33 is calculated. Next, the procedure proceeds to step S305, and an after-starting correction amount of the fuel injection amount is calculated on the basis of the engine rotation speed and the load. Next, the procedure proceeds to step S306, and a warm-up correction amount of the fuel injection amount is calculated on the basis of the cooling water temperature. Next, the procedure proceeds to step S307, and other correction amount 1 is calculated.

On the other hand, when the judgment condition of the step S303 is not established, that is, the air pump 33 is OFF and the secondary air is not being supplied (before time t0 shown in FIG. 18A), the procedure proceeds to step S308, an after-starting correction amount of the fuel injection amount is calculated on the basis of the engine rotation speed and the load. Next, the procedure proceeds to step S309, and a warm-up correction amount of the fuel injection amount is calculated on the basis of the cooling water temperature. Next, the procedure proceeds to step S310, and other correction amount 1 is calculated on the basis of the other operation parameters of the internal combustion engine 10.

On the other hand, when the judgment condition of the step S302 is not established, that is, when the cooling water temperature is high to be the specified temperature or higher, the procedure proceeds to step S311, and other correction amount 2 is calculated on the basis of the other operation parameters of the internal combustion engine 10. After the processing of the step S307, the step S310 or the step S311, the procedure proceeds to step S312, a final fuel injection amount TAU is calculated, and this routine is ended.

Next, a processing procedure of the air-fuel ratio F/B control at the step S205 of the fuel injection control routine of FIG. 3 will be described based on the flowchart of FIG. 5 and with reference to FIGS. 18A and 18B.

In FIG. 5, at step S401, an after-mentioned target air-fuel ratio setting processing is executed. Next, the procedure proceeds to step S402, the air-fuel ratio F/B control processing is executed for a target air-fuel ratio set at the step S401, and this routine is ended. In this air-fuel ratio F/B control processing, the fuel injection amount is adjusted so that a combustion air-fuel ratio as an air-fuel ratio which is estimated and calculated on the basis of at least one of the engine rotation speed of the internal combustion engine 10, the load, the intake air amount, the cooling water temperature and the after-starting elapsed time, is supplied to the internal combustion engine 10 and contributes to combustion is directed to the rich side and the lean side with respect to the target air-duel ratio according to the rich dither coefficient and the lean dither coefficient set on the basis of, as described later, an average air-fuel ratio as an average value of the before-catalyst air-fuel ratio detected by the A/F sensor 24 and introduced to the three-way catalyst 23 or on the basis of a minimum air-fuel ratio (see FIG. 18A) as a minimum value of the before-catalyst air-fuel ratio.

Next, a processing procedure of the target air-fuel ratio setting at the step S401 of the air-fuel ratio F/B control routine of FIG. 5 will be described based on the flowchart of FIG. 6 and with reference to FIG. 18A.

In FIG. 6, at step S501, it is judged whether the air pump 33 is ON. When the judgment condition of the step S501 is established, that is, when the secondary air is being supplied from the air pump 33, the procedure proceeds to step S502, and an APON flag indicating that the secondary air is being supplied from the air pump 33 is set to "1". On the other hand, when the judgment condition of the step S501 is not established, that is, when the secondary air is not being supplied from the air pump 33, the step S502 is skipped.

Next, the procedure proceeds to step S503, and it is judged whether the APON flag is "1". When the judgment condition of the step S503 is established, that is, when the APON flag is "1" and the secondary air is being supplied from the air pump 33 (time t0 to time t1 shown in FIG. 18A), the procedure proceeds to step S504, an after-mentioned target air-fuel ratio setting processing at the air pump ON time is executed, and this routine is ended. On the other hand, when the judgment condition of the step S503 is no t established, that is, when the APON flag is "0" and the secondary air is not being supplied from the air pump 33 (at and after time t1 shown in FIG. 18A), the procedure proceeds to step S505, a well-known normal target air-fuel ratio setting processing is executed, and this routine is ended.

Next, a processing procedure of target air-fuel ratio setting at the air pump ON time of step S504 of the target air-fuel ratio setting routine of FIG. 6 and during the supply of the secondary air will be described based on a flowchart of FIG. 17 and with reference to FIG. 18A.

Figure 17:
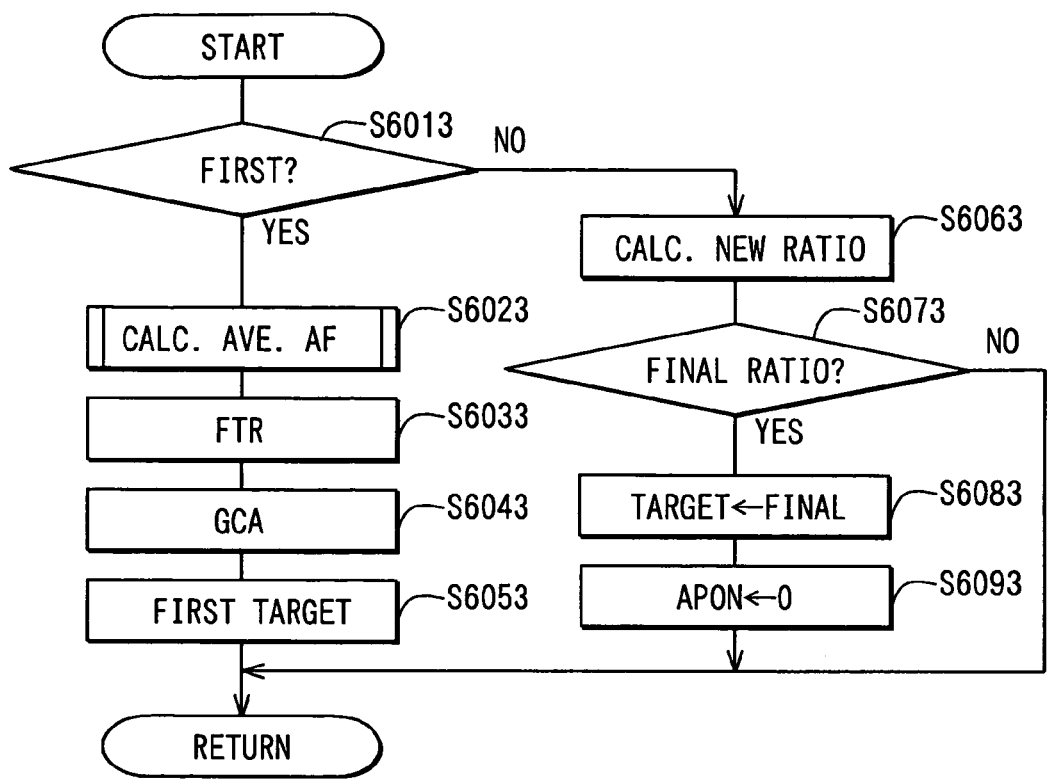
FIG. 17 is a flowchart showing a processing procedure of air pump ON time target air-fuel ratio setting in FIG. 6.

In FIG. 17, at step S6013, it is judged whether the air pump is ON, the secondary air is being supplied, and the first target air-fuel ratio setting is performed. When the judgment condition of the step S6013 is established, that is, when the first target air-fuel ratio setting is performed (time t0 shown in FIG. 18A), the procedure proceeds to step S6023, and an average air-fuel ratio calculation processing is executed. In this average air-fuel ratio calculation processing, before-catalyst air-fuel ratios detected by the A/F sensor 24 and introduced to the three-way catalyst 23 are successively read in, and those are subjected to arithmetic mean, so that the average air-fuel ratio (see FIG. 18A) is calculated. Next, the procedure proceeds to step S6033, and a final target air-fuel ratio FTR is set to a stoichiometric air-fuel ratio.

Next, the procedure proceeds to step S6043, a target air-fuel ratio gradual change amount GCA is calculated on the basis of a difference between the average air-fuel ratio as the initial value of the target air-fuel ratio calculated at the step S6023 and the stoichiometric air-fuel ratio set at the step S6033. Next, the procedure proceeds to step S6053, the average air-fuel ratio calculated at the step S6023 is made the first target air-fuel ratio at the ON time of the air pump, and this routine is ended.

On the other hand, when the judgment condition of the step S6013 is not established, that is, when the first target air-fuel ratio setting is not performed (period until the average air-fuel ratio calculated at time t0 shown in FIG. 18A becomes 1.0 (stoichiometric air-fuel ratio)), the procedure proceeds to step S6063, and a new target air-fuel ratio is calculated by adding the target air-fuel ratio gradual change amount calculated at the step S6043 to the last target air-fuel ratio. Next, the procedure proceeds to step S6073, and it is judged whether the target air-fuel ratio has reached the stoichiometric air-fuel ratio as the final target air-fuel ratio. When the judgment condition of the step S6073 is not established, that is, when the target air-fuel ratio has not yet reached the stoichiometric air-fuel ratio, this routine is ended.

On the other hand, when the judgment condition of the step S6073 is established, that is, when the target air-fuel ratio has reached the stoichiometric air-fuel ratio as the final target air-fuel ratio, the procedure proceeds to step S6083, and the final target air-fuel ratio is made the target air-fuel ratio. Next, the procedure proceeds to step S6093, the APON flag is set to "0", that is, it is indicated that the air-fuel ratio control is ended during the supply of the secondary air, and this routine is ended.

Incidentally, in the secondary air supply control shown in FIG. 18B, similarly to the foregoing embodiment, the air-fuel ratio F/B control condition is established at time t00, and the secondary air is supplied in the period of from time t00 to time t01. However, during the supply of the secondary air, the air-fuel ratio F/B control is executed while the before-catalyst air-fuel ratio is made the target air-fuel ratio as it is. As stated above, in the air-fuel ratio F/B control in which the continuously changing before-catalyst air-fuel ratio is made the target air-fuel ratio, it is understood that there occurs a change in the engine rotation speed corresponding to a change in the before-catalyst air-fuel ratio and the drivability becomes worse.

As stated above, the secondary air supply control apparatus of the internal combustion engine of this embodiment includes the three-way catalyst 23 disposed midway in the exhaust passage 22 of the internal combustion engine 10 and for purifying the exhaust gas, the secondary air supply mechanism 30 for supplying the secondary air into the exhaust passage 22 at the upstream side of the three-way catalyst 23, the A/F sensor 24 as the air-fuel ratio detection unit disposed in the exhaust passage 22 at the upstream side of the three-way catalyst 23 and at the downstream side of the secondary air supply hole 31a of the secondary air supply passage 31 and for detecting the before-catalyst air-fuel ratio which is the air-fuel ratio in the exhaust gas and is introduced to the three-way catalyst 23, and the air-fuel ratio arithmetic unit realized by the CPU 41 of the ECU 40 and for calculating, as the average air-fuel ratio, the average value of the before-catalyst air-fuel ratio as the output value detected by the A/F sensor 24 during the supply of the secondary air provided by the secondary air supply mechanism 30. Besides, the secondary air supply control apparatus of the internal combustion engine of this embodiment includes the air-fuel ratio F/B control unit realized by the CPU 41 of the ECU 40 and for executing the air-fuel ratio F/B control so that when the specified air-fuel ratio F/B (feedback) control condition is established during the supply of the secondary air provided by the secondary air supply mechanism 30, the average air-fuel ratio calculated by the air-fuel ratio arithmetic unit becomes coincident with the previously set target air-fuel ratio.

That is, during the supply of the secondary air provided by the secondary air supply mechanism 30, the average value of the before-catalyst air-fuel ratio as the output value detected by the A/F sensor 24 is calculated as the average air-fuel ratio as the substantial air-fuel ratio. The average air-fuel ratio obtained in this way can be obtained as the stable value even if the before-catalyst air-fuel ratio detected by the A/F sensor 24 is much changed. Besides, during the supply of the secondary air provided by the secondary air supply mechanism 30, when the specified air-fuel ratio F/B control condition is established, the air-fuel ratio F/B control is executed so that the obtained average air-fuel ratio becomes coincident with the previously set target air-fuel ratio. As stated above, according to the air-fuel ratio F/B control using the average air-fuel ratio, the air-fuel ratio F/B control giving priority to a reduction in an emission can be executed.

Next, a modified example of the processing procedure of the target air-fuel ratio setting during the supply of the secondary air at the ON time of the air pump at the step S504 of the target air-fuel ratio setting routine of FIG. 6 will be described based on a flowchart of FIG. 19 and with reference to FIG. 18A.

Figure 19:
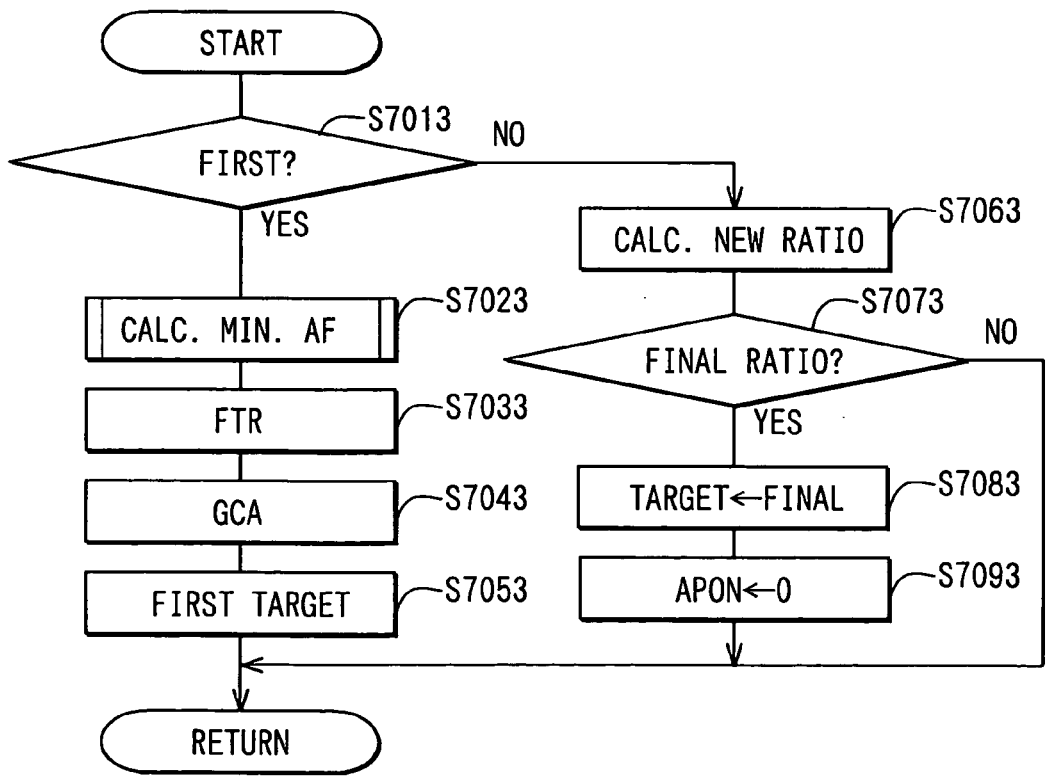
FIG. 19 is a flowchart showing a modified example of the processing procedure of the air pump ON time target air-fuel ratio setting in FIG. 17.

In FIG. 19, since step S7013 to step S7093 except for step S7023 and step S7053 correspond to the step S6013 to the step S6093 of FIG. 17, their detailed description will be omitted. Here, at the step S7023, a minimum air-fuel ratio calculation processing is executed. In this minimum air-fuel ratio calculation processing, before-catalyst air-fuel ratios detected by the A/F sensor 24 and introduced to the three-way catalyst 23 are sequentially read in, a minimum value of those is obtained and a minimum air-fuel ratio (see FIG. 18A) is calculated. Besides, at the step S7053, the minimum air-fuel ratio calculated at the step S7023 is made the first target air-fuel ratio at the ON time of the air pump, and this routine is ended. As stated above, the secondary air supply control apparatus of the internal combustion engine of this modified example includes the three-way catalyst 23 disposed midway in the exhaust passage 22 of the internal combustion engine 10 and for purifying the exhaust gas, the secondary air supply mechanism 30 for supplying the secondary air into the exhaust passage 22 at the upstream side of the three-way catalyst 23, the A/F sensor 24 as the air-fuel ratio detection unit disposed in the exhaust passage 22 at the upstream side of the three-way catalyst 23 and at the downstream side of the secondary air supply hole 31a of the secondary air supply passage 31 and for detecting the before-catalyst air-fuel ratio which is the air fuel ratio in the exhaust gas and is introduced to the three-way catalyst 23, and the air-fuel ratio arithmetic unit realized by the CPU 41 of the ECU 40 and for calculating, as the minimum air-fuel ratio, the minimum value of the before-catalyst air-fuel ratios detected by the A/F sensor 24 during the supply of the secondary air provided by the secondary air supply mechanism 30. Besides, the secondary air supply control apparatus of the internal combustion engine of this modified example includes the air-fuel ratio F/B control unit realized by the CPU 41 of the ECU 40 and for executing the air-fuel ratio F/B control so that when the specified air-fuel ratio F/B control condition is established during the supply of the secondary air provided by the secondary air supply mechanism 30, the minimum air-fuel ratio calculated by the air-fuel ratio arithmetic unit becomes coincident with the previously set target air-fuel ratio.

That is, during the supply of the secondary air provided by the secondary air supply mechanism 30, the minimum value of the before-catalyst air-fuel ratio as the output value detected by the A/F sensor 24 is calculated as the minimum air-fuel ratio as the substantial air-fuel ratio. The minimum air-fuel ratio obtained in this way can be obtained as the stable value even if the before-catalyst air-fuel ratio detected by the A/F sensor 24 is much changed. Besides, during the supply of the secondary air provided by the secondary air supply mechanism 30, when the specified air-fuel ratio F/B control condition is established, the air-fuel ratio F/B control is executed so that the obtained minimum air-fuel ratio becomes coincident with the previously set target air-fuel ratio. As stated above, according to the air-fuel ratio F/B control using the minimum air-fuel ratio, the air-fuel ratio F/B control giving priority to the improvement in the drivability can be executed.

In the above embodiment or the modified example, although the description has been given to the case where the average air-fuel ratio or the minimum air-fuel ratio of the before-catalyst air-fuel ratio detected by the A/F sensor 24 is calculated and is used as the substantial air-fuel ratio introduced to the three-way catalyst 23, in the case where the present invention is carried out, it is not limited to this. Since the output value from the A/F sensor 24 is periodically changed every combustion cycle of each cylinder of the internal combustion engine 10, when it is previously known that a before-catalyst air-fuel ratio detected by the A/F sensor 24 at a specified crank angle corresponds to the substantial air-fuel ratio, the air-fuel ratio F/B control can be performed by using only the before-catalyst air-fuel ratio detected at the specified crank angle.

The secondary air supply control apparatus of the internal combustion engine as stated above includes the three-way catalyst 23 disposed midway in the exhaust passage 22 of the internal combustion engine 10 and for purifying the exhaust gas, the secondary air supply mechanism 30 for supplying the secondary air into the exhaust passage 22 at the upstream side of the three-way catalyst 23, the A/F sensor 24 as the air-fuel ratio detection unit disposed in the exhaust passage 22 at the upstream side of the three-way catalyst 23 and at the downstream side of the secondary air supply hole 31a of the secondary air supply passage 31 and for detecting the before-catalyst air-fuel ratio as the air-fuel ratio in the exhaust gas and introduced to the three-way catalyst 23, the crank angle sensor 27 as the crank angle detection unit for detecting the crank angle [° CA] of the internal combustion engine 10, and the air-fuel ratio arithmetic unit realized by the CPU 41 of the ECU 40 and for calculating, during the supply of the secondary air provided by the secondary air supply mechanism 30, the before-catalyst air-fuel ratio detected by the A/F sensor 24 at the specified crank angle as the actual air-fuel ratio. Besides, the secondary air supply control apparatus includes the air-fuel ratio F/B control unit realized by the CPU 41 of the ECU 40 and for executing the air-fuel ratio F/B control so that when the specified air-fuel ratio F/B control condition is established during the supply of the secondary air provided by the secondary air supply mechanism 30, the air-fuel ratio calculated by the air-fuel ratio arithmetic unit becomes coincident with the previously set target air-fuel ratio. The same operation and effects as those of the foregoing embodiment or the modified example can be expected.

Then, in the above embodiment and the modified example, although the description has been given to the case where the target air-fuel ratio in the air-fuel ratio F/B control is set on the basis of the output value detected by the A/F sensor 24 during the supply of the secondary air provided by the secondary air supply mechanism 30, in the case where the present invention is carried out, it is not limited to this. For example, in the case where after the supply of the secondary air is ended, its influence remains and the engine rotation speed is changed, an air-fuel ratio F/B control similar to that during the supply of the secondary air may be executed even after the end of the supply of the secondary air.

The air-fuel ratio F/B control unit realized by the CPU 41 of the ECU 40 of the secondary air supply control apparatus of the internal combustion engine as stated above executes the air-fuel ratio F/B control in the period when the supply of the secondary air provided by the secondary air supply mechanism 30 has an influence. Not only during the supply of the secondary air provided by the secondary air supply mechanism in the foregoing embodiment and the modified example, but also in th e case where the engine rotation speed is changed by its influence even after the supply of the secondary air, a similar air-fuel ratio F/B control is continuously executed. Thus, in addition to the operation and effects of the foregoing embodiment or the modified example, further reduction in the emission and the improvement of the drivability can be expected.

What is claimed is:

1. A secondary air supply control apparatus for an internal combustion engine, comprising:
    a catalyst for purifying an exhaust gas, the catalyst being disposed in an exhaust passage of an internal combustion engine and;
    a secondary air supply mechanism for supplying secondary air into the exhaust passage at an upstream side of the catalyst;
    an air-fuel ratio detection unit for detecting an air-fuel ratio in the exhaust gas, the air-fuel ratio detection unit being disposed in the exhaust passage between the catalyst and a secondary air supply hole and for detecting an air-fuel ratio in the exhaust gas; and
    an air-fuel ratio feedback control unit for executing an air-fuel ratio feedback control to cause the air-fuel ratio detected by the air-fuel ratio detection unit to become coincident with a previously set target air-fuel ratio when a specified air-fuel ratio feedback control condition is established during supply of the secondary air provided by the secondary air supply mechanism, the target air-fuel ratio being set to a normal target air-fuel ratio in a first setting process executed by the air-fuel ratio feedback control unit when the secondary air is not supplied into the exhaust passage by the secondary air supply mechanism, and the target air-fuel ratio being set as said previously set target air-fuel ratio in a second setting process executed by the air-fuel ratio feedback control unit when the secondary air is being supplied into the exhaust passage by the secondary air supply mechanism.

2. A secondary air supply control apparatus for an internal combustion engine, comprising:
    a catalyst for purifying an exhaust gas, the catalyst being disposed in an exhaust passage of an internal combustion engine and;
    a secondary air supply mechanism for supplying secondary air into the exhaust passage at an upstream side of the catalyst;
    an air-fuel ratio detection unit for detecting an air-fuel ratio in the exhaust gas, the air-fuel ratio detection unit being disposed in the exhaust passage between the catalyst and a secondary air supply hole and for detecting an air-fuel ratio in the exhaust gas; and
    an air-fuel ratio feedback control unit for executing an air-fuel ratio feedback control to cause the air-fuel ratio detected by the air-fuel ratio detection unit to become coincident with a previously set target air-fuel ratio when a specified air-fuel ratio feedback control condition is established during supply of the secondary air provided by the secondary air supply mechanism;
    wherein the air-fuel ratio feedback control unit sets an initial value of the target air-fuel ratio at a start time of execution of the air-fuel ratio feedback control to the air-fuel ratio detected by the air-fuel ratio detection unit at this time,
    and gradually changes the target air-fuel ratio from the initial value to a specified air-fuel ratio.

3. A secondary air supply control apparatus for an internal combustion engine, comprising:
    a catalyst for purifying an exhaust gas, the catalyst being disposed in an exhaust passage of an internal combustion engine and;
    a secondary air supply mechanism for supplying secondary air into the exhaust passage at an upstream side of the catalyst;
    an air-fuel ratio detection unit for detecting an air-fuel ratio in the exhaust gas, the air-fuel ratio detection unit being disposed in the exhaust passage between the catalyst and a secondary air supply hole and for detecting an air-fuel ratio in the exhaust gas; and
    an air-fuel ratio feedback control unit for executing an air-fuel ratio feedback control to cause the air-fuel ratio detected by the air-fuel ratio detection unit to become coincident with a previously set target air-fuel ratio when a specified air-fuel ratio feedback control condition is established during supply of the secondary air provided by the secondary air supply mechanism;

wherein the air-fuel ratio feedback control unit sets an initial value of the target air-fuel ratio at a start time of execution of the air-fuel ratio feedback control to a minimum air-fuel ratio detected in a specified period by the air-fuel ratio detection unit from a supply start of the secondary air, and gradually changes the target air-fuel ratio from the initial value to a specified air-fuel ratio.

4. A secondary air supply control apparatus of an internal combustion engine, comprising:
   a catalyst for purifying an exhaust gas, the catalyst being disposed in an exhaust passage of an internal combustion engine and;
   a secondary air supply mechanism for supplying secondary air into the exhaust passage at an upstream side of the catalyst;
   an air-fuel ratio detection unit for detecting an air-fuel ratio in the exhaust gas, the air-fuel ratio detection unit being disposed in the exhaust passage between the catalyst and a secondary air supply hole and;
   an air-fuel ratio estimation unit for estimating an air-fuel ratio supplied to the internal combustion engine on the basis of various operation parameters; and
   a target air-fuel ratio setting unit for setting an initial value of a target air-fuel ratio for the air-fuel ratio detected by the air-fuel ratio detection unit in an air-fuel ratio feedback control immediately after an end of supply of the secondary air provided by the secondary air supply mechanism to an air-fuel ratio estimated by the air-fuel ratio estimation unit at this time, and for gradually changing the target air-fuel ratio from the initial value to a stoichiometric air-fuel ratio.

5. A secondary air supply control apparatus of an internal combustion engine according to claim 4, wherein the various operation parameters include at least one of an engine rotation speed, a load, an intake air amount, a cooling water temperature and an after-starting elapsed time.

6. A secondary air supply control apparatus of an internal combustion engine, comprising:
   a catalyst disposed in an exhaust passage of an internal combustion engine and for purifying an exhaust gas;
   a secondary air supply mechanism for supplying secondary air into the exhaust passage at an upstream side of the catalyst;
   an air-fuel ratio detection unit for detecting an air-fuel ratio in the exhaust gas, the air-fuel ratio detection unit being disposed in the exhaust passage between the catalyst and a secondary air supply hole; and
   a target air-fuel ratio setting unit for setting an initial value of a target air-fuel ratio for the air-fuel ratio detected by the air-fuel ratio detection unit in an air-fuel ratio feedback control immediately after an end of supply of the secondary air provided by the secondary air supply mechanism to an air-fuel ratio detected by the air-fuel ratio detection unit after a specified time has passed since the air-fuel ratio feedback control was suspended at this time, and for gradually changing the target air-fuel ratio from the initial value to a stoichiometric air-fuel ratio.

7. A secondary air supply control apparatus of an internal combustion engine, comprising:
   a catalyst disposed in an exhaust passage of an internal combustion engine and for purifying an exhaust gas;
   a secondary air supply mechanism for supplying secondary air into the exhaust passage at an upstream side of the catalyst; and
   a fuel supply control unit for calculating a fuel injection amount based on a basic fuel injection amount and a correction amount to correct the basic fuel injection amount, the fuel supply control unit inhibiting a correction which would increase the basic fuel injection amount by the correction amount to correct the basic fuel injection amount during supply of the secondary air provided by the secondary air supply mechanism.

8. A secondary air supply control apparatus of an internal combustion engine, comprising:
   a catalyst disposed in an exhaust passage of an internal combustion engine and for purifying an exhaust gas;
   a secondary air supply mechanism for supplying secondary air into the exhaust passage at an upstream side of the catalyst;
   an air-fuel ratio detection unit for detecting an air-fuel ratio in the exhaust gas, the air-fuel ratio detection unit being disposed in the exhaust passage between the catalyst and a secondary air supply hole; and
   a fuel supply control unit for setting, when a fuel injection amount to the internal combustion engine is increased to maintain the air-fuel ratio detected by the air-fuel ratio detection unit during supply of the secondary air provided by the secondary air supply mechanism, a specified delay time for the increase in the amount from a supply start of the secondary air.

9. A secondary air supply control apparatus of an internal combustion engine according to claim 8, wherein the fuel supply control unit gradually changes the fuel injection amount until the increase in the amount is attained.

10. A secondary air supply control apparatus of an internal combustion engine, comprising:
    a catalyst disposed in an exhaust passage of an internal combustion engine and for purifying an exhaust gas;
    a secondary air supply mechanism for supplying secondary air into the exhaust passage at an upstream side of the catalyst;
    an air-fuel ratio detection unit for detecting an air-fuel ratio in the exhaust gas, the air-fuel ratio detection unit disposed in the exhaust passage between the catalyst and a secondary air supply hole; and
    an air-fuel ratio arithmetic unit for calculating, as the air-fuel ratio, an average value of output values detected by the air-fuel ratio detection unit during supply of the
    secondary air provided by the secondary air supply mechanism.

11. A secondary air supply control apparatus of an internal combustion engine according to claim 10, further comprising an air-fuel ratio feedback control unit for executing an air-fuel ratio feedback control so that when a specified air-fuel ratio feedback control condition is established during supply of the secondary air provided by the secondary air supply mechanism, the air-fuel ratio calculated by the air-fuel ratio arithmetic unit becomes coincident with a previously set target air-fuel ratio.

12. A secondary air supply control apparatus of an internal combustion engine according to claim 11, wherein the air-fuel ratio feedback control unit executes the air-fuel ratio feedback control in a period when the supply of the secondary air provided by the secondary air supply mechanism has an influence.

13. A secondary air supply control apparatus of an internal combustion engine, comprising:
    a catalyst disposed in an exhaust passage of an internal combustion engine and for purifying an exhaust gas; a secondary air supply mechanism for supplying secondary air into the exhaust passage at an upstream side of the catalyst;

an air-fuel ratio detection unit disposed in the exhaust passage between the catalyst and a secondary air supply hole and for detecting an air-fuel ratio in the exhaust gas; and an air-fuel ratio arithmetic unit for calculating, as the air-fuel ratio, a minimum value of air-fuel ratio values detected and output by the air-fuel ratio detection unit during supply of the secondary air provided by the secondary air supply mechanism.

* * * * *